(12) United States Patent
Buyuktanir et al.

(10) Patent No.: US 8,257,639 B2
(45) Date of Patent: Sep. 4, 2012

(54) METHOD OF MAKING STIMULI RESPONSIVE LIQUID CRYSTAL-POLYMER COMPOSITE FIBERS

(75) Inventors: Ebru A. Buyuktanir, Wooster, OH (US); Margaret W. Frey, Ithaca, NY (US); John L. West, Hartville, OH (US)

(73) Assignee: Kent State University, Kent, OH (US)

( * ) Notice: Subject to any disclaimer, the term of this patent is extended or adjusted under 35 U.S.C. 154(b) by 380 days.

(21) Appl. No.: 12/586,460

(22) Filed: Sep. 22, 2009

(65) Prior Publication Data

US 2011/0068493 A1    Mar. 24, 2011

(51) Int. Cl.
*B29C 47/00* (2006.01)
*B29D 11/00* (2006.01)

(52) U.S. Cl. ............. 264/465; 264/1.27; 264/172.13; 264/172.15

(58) Field of Classification Search ............... 264/1.24, 264/1.27, 1.36, 465, 172.13, 172.14, 172.15
See application file for complete search history.

(56) References Cited

U.S. PATENT DOCUMENTS

| | | |
|---|---|---|
| 4,684,477 A | 8/1987 | Sugimori et al. |
| 5,068,054 A | 11/1991 | Betterton et al. |
| 5,178,791 A | 1/1993 | Wand et al. |
| 5,238,602 A | 8/1993 | Petrzilka et al. |
| 5,254,747 A | 10/1993 | Janulis |
| 5,298,188 A | 3/1994 | Vergnolle et al. |
| 5,370,820 A | 12/1994 | Boden et al. |
| 5,399,701 A | 3/1995 | Janulis |
| 5,457,235 A | 10/1995 | Wand et al. |
| 5,543,078 A | 8/1996 | Walba et al. |
| 5,567,349 A | 10/1996 | Kelly et al. |
| 5,593,617 A | 1/1997 | Kelly et al. |
| 5,629,055 A | 5/1997 | Revol et al. |
| 5,637,256 A | 6/1997 | Walba et al. |
| 5,650,534 A | 7/1997 | Kelly et al. |
| 6,312,618 B1 | 11/2001 | Wu et al. |
| 6,395,351 B1 | 5/2002 | Benecke et al. |
| 6,570,632 B2 | 5/2003 | Lavrentovich et al. |
| 6,676,851 B1 | 1/2004 | Buchecker et al. |
| 6,689,290 B2 | 2/2004 | Boden et al. |
| 6,743,377 B2 | 6/2004 | Sato et al. |

(Continued)

FOREIGN PATENT DOCUMENTS

WO    WO 2005/024101 B1    3/2005

OTHER PUBLICATIONS

Nakata, M. et al., Hollow fibers containing various display elements: A novel structure for electronic paper, Journal of the SID, vol. 14/8, 2006, pp. 723-727, Japan.

(Continued)

*Primary Examiner* — Mathieu D. Vargot
(74) *Attorney, Agent, or Firm* — Hudak, Shunk & Farine

(57) ABSTRACT

A process for making a stimuli responsive liquid crystal-polymer composite fiber comprising mixing a liquid crystal, a polymer, and a solvent; processing the mixture in the presence of an electric potential across a collection distance; phase separating a polymer and said liquid crystal; and encapsulating said liquid crystal within said polymer. The fiber generally comprises a liquid crystal core and a polymer shell wherein the liquid crystal is responsive to chemical changes, thermal and mechanical effects, as well as electrical and magnetic fields. A liquid crystal containing fiber can be utilized as optical fibers, in textiles, and in optoelectronic devices.

20 Claims, 25 Drawing Sheets

U.S. PATENT DOCUMENTS

| | | |
|---|---|---|
| 6,753,454 B1 | 6/2004 | Smith et al. |
| 6,793,986 B2 | 9/2004 | Prechtl et al. |
| 7,070,712 B2 | 7/2006 | Tang et al. |
| 7,416,682 B2 | 8/2008 | Frigoli et al. |
| 7,442,475 B2 | 10/2008 | Farrand et al. |

OTHER PUBLICATIONS

Wu, Y., et al., Liquid crystal fibers produced by using electrospinning technique, Colloid Polym Sci, Vo. 286, 2008, pp. 897-905, Springer-Verlag, China.

Yao, Y., et al., Fiber-Oriented Liquid Crystal Polarizers Based on Anisotropic Electrospinning, Adv. Mater., vol. 19, 2007, pp. 3707-3711, Wiley-VCH Verlag, Weinheim.

Lagerwall, J., et al., Coaxial electrospinning of microfibers with liquid crystal in the core, Chem. Commun., 2008, pp. 5420-5422, UK.

Shiyanovskaya, I, et al., Distinguished Contributed Paper: Single Substrate Encapsulated Cholesteric LCDs, SID 05 Digest, 2005, pp. 1556-1559.

Montbach, E., et al., Flexible Ink Jet Printed Conductive Polymer . . . , SID 06 Digest, 2006, pp. 1737-1740.

Khan, A., et al., Progress in flexible and drapable reflective cholesteric displays, Journal of the SID, 15/1, 2007, pp. 9-16.

Subbiah, T., et al., Electrospinning of Nanofibers, Journal of Applied Polymer Science, vol. 96, 2005, pp. 557-569, Wiley Periodicals, Inc.

Roshi, A., et al., Evolution of the isotropic-to-nematic phase transition . . . , Physical Review E., vol. 69, 2004, pp. 031703-1-031703-11.

Iannacchione, G.S., et al., Nematic ordering in highly restrictive Vycor glass, Physical Review E., vol. 53, No. 3, 1996, pp. 2402-2411.

Schadt, M., Liquid Crystal Materials and Liquid Crystal Displays, Annu. Rev. Mater. Sci., vol. 27, 1997, pp. 305-379.

Crawford, G.P., et al., Surface elastic and molecular-anchoring properties . . . , Physical Review A, vol. 45, No. 12, 1992, pp. 8693-8708.

West, J., Phase Separation, of Liquid Crystals in Polymers, Mol. Cryst. Liq. Cryst Inc., Neimlin Opt., vol. 157, 1988, pp. 427-441.

Kutnaj, Z., et al., Thermal Study of Octylcyanobiphenyl liquid crystal . . . , Fluid Phase Equilibria, 222-223, 2004, pp. 275-281, Elsevier B.V.

Clark, N., et al., X-Ray Scattering Study of Smectic Ordering . . . , Physical Review Letters, vol. 71, No. 21, 1993, pp. 3505-3508.

Iannacchione, G., et al., Specific heat dependence on orientational order . . . , Physical Review E, vol. 50. No. 6, 1994, pp. 4780-4795.

Iannacchione, G., et al., Liquid crystalline behavior of octylcyanobiphenyl . . . , Physical Review E, vol. 56, No. 1, 1997, pp. 554-561.

Khan, A., et al., Invited Paper: Recent Progress in Flexible and Drapable . . . , SID 06 Digest, 2006, pp. 1728-1731.

Koncar, V., Optical Fiber Fabric Displays, Optics & Photonics News, 2005, pp. 40-44.

Yase, K., et al., Late-News Paper: Large Area Flexible Display of Fiber OLED, SID 06 Digest, 2006, pp. 1870-1873.

Reneker, D., et al., Electrospinning jets and polymer nanofibers, Polymer, vol. 49, 2008, pp. 2387-2425.

Li, D., et al., Electrospun polylactic acid nanofiber membranes . . . , Journal of Membrane Science, vol. 279, 2006, pp. 354-363.

Li, D., et al., Availability of biotin incorporated in electrospun PLA . . . , Polymer, vol. 48, 2007, pp. 6340-6347.

Takezo H., et al., Bent-Core Liquid Crystals: Their Mysterious . . . , Japanese Journal of Applied Physics, Vo. 45, No. 2A, 2006, pp. 597-625.

Suzuki, A., et al., Layer Structure of Antiferroelectric Liquid Crystal MHPOBC, Japanese Journal of Applied Physics, vol. 29, No. 2, 1990, pp. L336-L338.

Dobb, M.G., et al., Properties and Applications of Liquid-Crystalline . . . , Advances in Polymer Science, vol. 60/61, 1984, pp. 61-98, Springer-Verlag, Berlin.

Frenot, A., et al. Polymer nanofibers assembled by electrospinning, Current Opinion in Colloid and Interface Science, vol. 8, 2003, pp. 64-75.

Ramaseshan, R., et al., Nanostructured ceramics by electrospinning, Journal of Applied Physics, vol. 102, 2007, pp. 111101-1-111101-17.

Wu, B.G., et al., Response times and voltages for PDLC light shutters, Liquid Crystals, vol. 33, Nos. 11-12, 2006, pp. 1315-1322.

Hikmet, R.A.M., Electrically induced light scattering from anisotropic gels, Journal of Applied Physics., Vo. 68, No. 9, 1990, pp. 4406-4412.

Khoo, I.C., Nonlinear optics of liquid crystalline materials, Physics Report, vol. 471, 2009, pp. 221-267, Elsevier B.V.

Chiccoli, C., et al., Topological defects in schlieren textures of biaxial . . . , Physical Review E, vol. 66, 2002, pp. 030701-1-030701-4.

Gu, M. et al., Effects of dielectric relaxation on the director dynamics of uniaxial . . . , Physical Review E, vol. 76, 2007, pp. 061702-1-061702-12.

Pishnyak, O., et al., Smectic-A-filled birefringent elements and fast . . . , Optical Engineering, vol. 45, 2006, pp. 044002-1-044002-9.

Scale: 50 μm, 20X objective

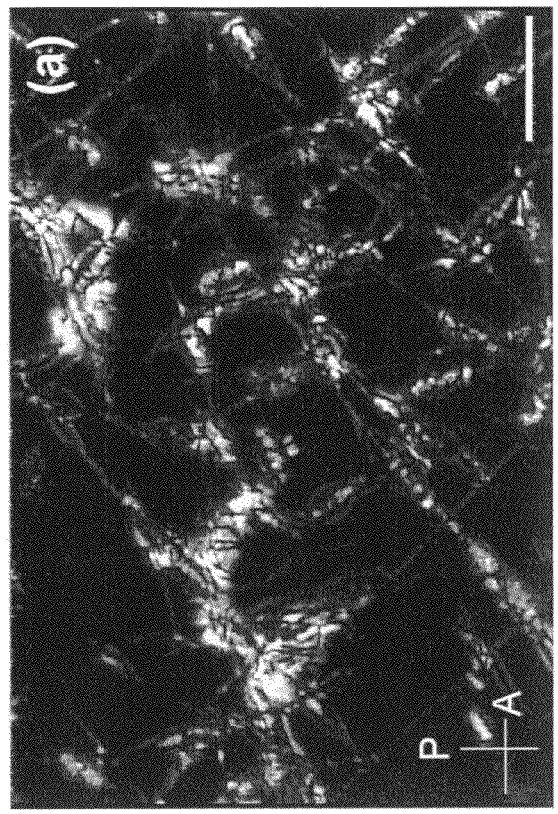 
Fig. 8(a)
Fig. 8(b)
Scale: 20μm, 50X objective

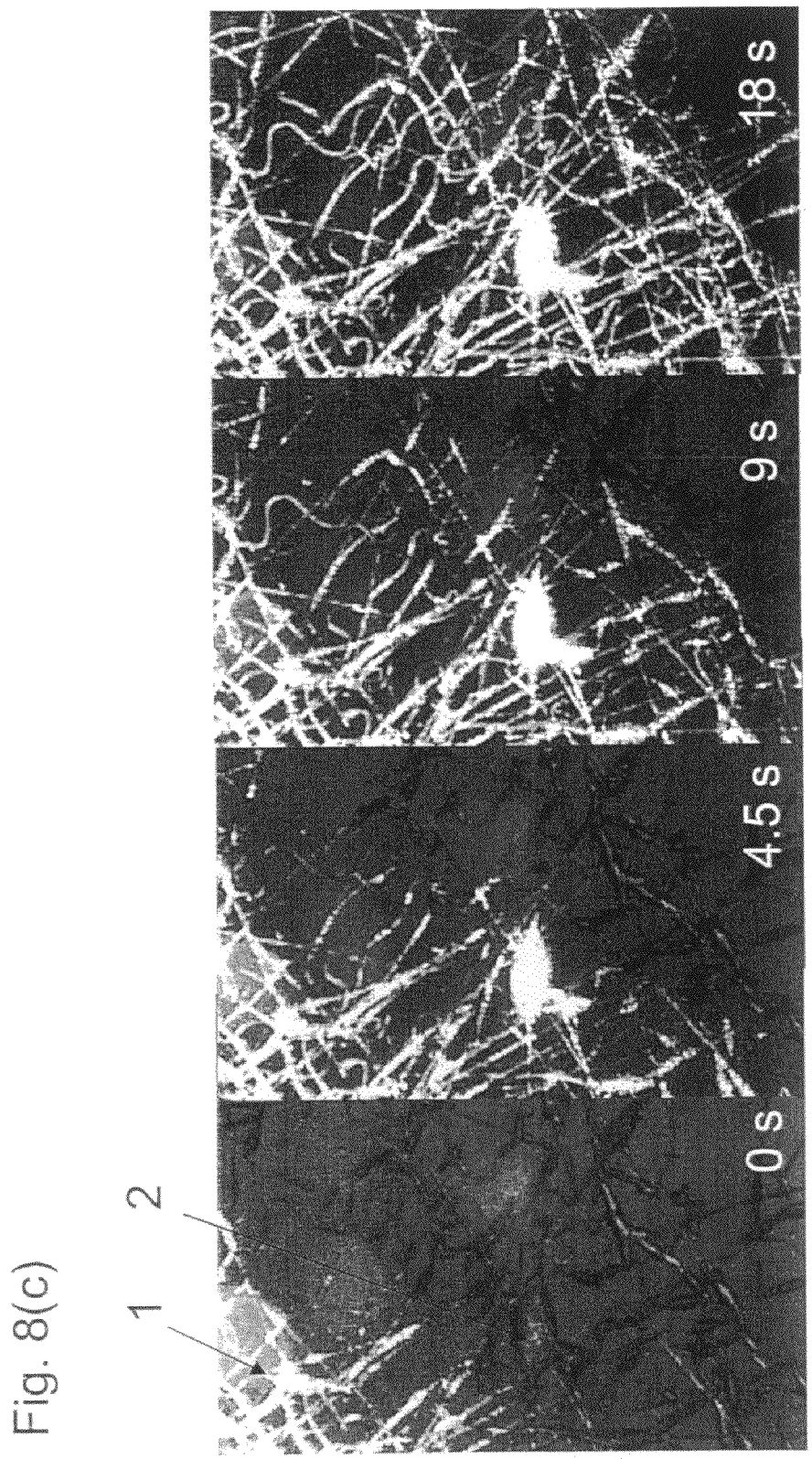

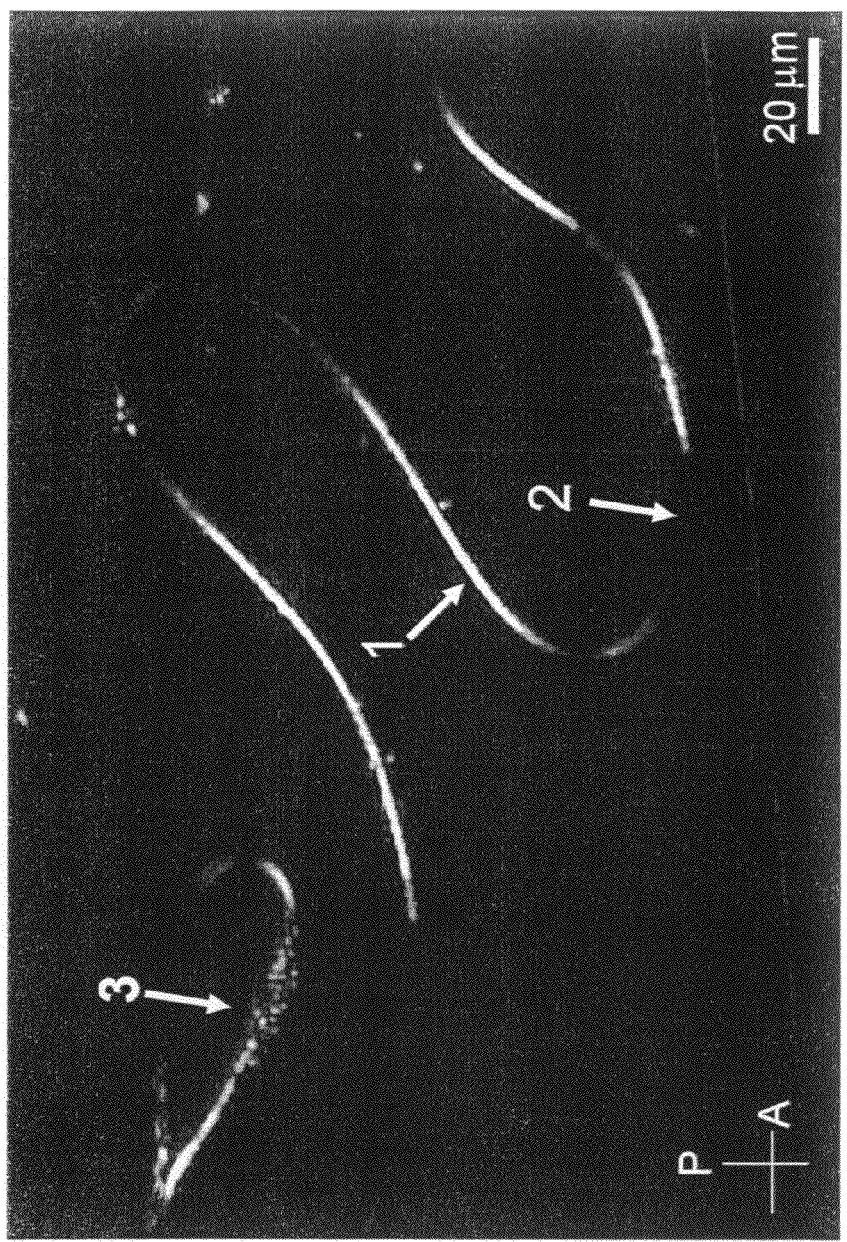

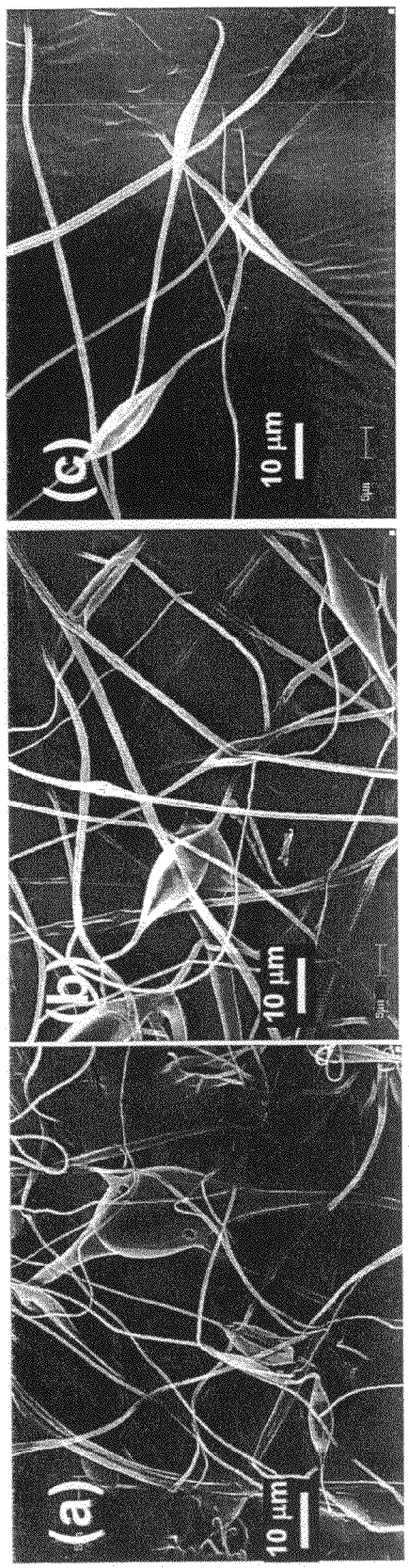

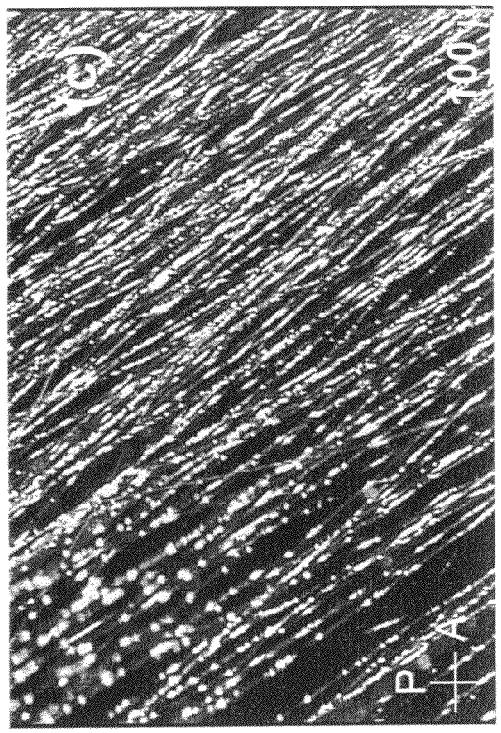
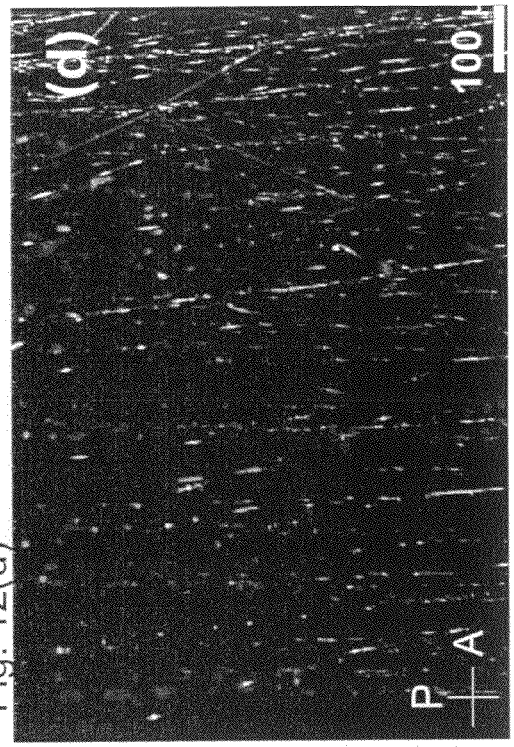
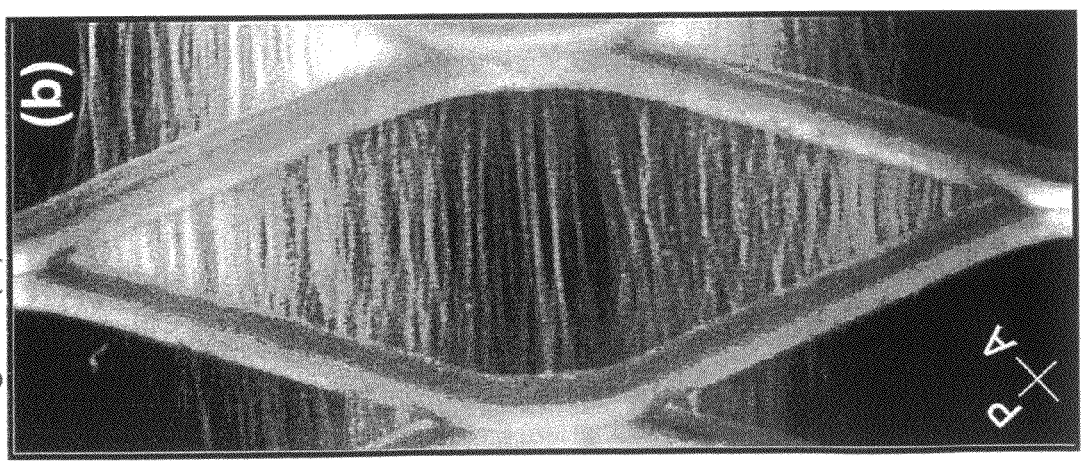

50 μm

20 μm

50 μm

50 μm

METHOD OF MAKING STIMULI RESPONSIVE LIQUID CRYSTAL-POLYMER COMPOSITE FIBERS

FIELD OF THE INVENTION

The present invention relates to light modulating liquid crystal devices and fibers utilizing core shell liquid crystal-polymer composite fibers and a fabrication method therefore. More specifically, the present invention relates to the manufacture of optoelectronic composite materials generally in the form of fiber having a polymeric shell encapsulating a low molecular weight liquid crystal core.

BACKGROUND OF THE INVENTION

Liquid crystals are soft matter systems in which strongly anisometric liquid crystal molecules display long-range orientational order, but possess partial or no long-range positional order. The anisotropic optical properties of liquid crystals are also the basis for their large birefringence. In addition, liquid crystal molecules possess anisotropic electric and magnetic susceptibilities and the orientation of liquid crystals can be changed by external stimuli, such as electric and magnetic fields. Therefore, these advanced materials have been extensively utilized in variety of display applications.

The liquid crystal/polymer composites of various types represent an important and broad class of three-dimensional structures utilized at the forefront of flexible liquid crystal display science and technology. Polymer dispersed liquid crystals and polymer stabilized liquid crystal systems may be given as the classical examples for the use of liquid crystal-polymer composite structures in display applications. In liquid crystal-polymer composites, the polymer component serves a number of critical functions: provides mechanical support (ruggedness); determines the thermomechanical stability of the composite; protects the device or fiber functionality from environment; helps to distribute the applied pressure by acting as a stress transfer medium (self-sustaining); provides durability, interlaminar toughness and shear/compressive/transverse strengths to the system in general, and maintains the cell gap of the device. Therefore, synthetically produced polymeric materials have been the key component toward producing self-sustaining and self-adhering flexible display prototypes.

The encapsulation of liquid crystal materials into polymer morphology via phase separation techniques such as polymerization induced phase separation (PIPS); thermally induced phase separation (TIPS); solvent induced phase separation (SIPS); UV Intensity gradient induced anisotropic phase-separation; and electric field induced phase separation—has been used to prepare light modulating devices. [J. L. West, *Mol. Cryst. Liq. Cryst.* 1988, 157, 427] Given that chemical and physical properties and the morphology of liquid crystal-polymer composites can be tailored for variety of applications, they have been utilized in sophisticated optical and electronic devices, such as in light shutters, bistable displays, switchable windows, portable electronics, and beam steering devices. In addition, liquid crystal materials can be confined to porous matrices, capillary tubes, cavities, and prefabricated inclusions by an infiltration (or permeation) method. The most often used matrices are controlled-pore glasses [Z. Kutnjak, et al., Fluid Phase Equilibria 2004, 222-223, 275], aerogels [N. A. Clark, et al., *Phys. Rev. Lett.*, 1993, 71, 3505], and aerosil particles [G. S. Iannacchione et al., *Phys. Rev. E* 1994, Vol. 50, No. 6, pp 4780-4795 and G. S. Iannacchione et al., *Phys. Rev. E* 1997, Vol. 56, No. 1, pp. 554-561]. In order to create optically responsive textiles and to enhance the overall flexibility of systems, researchers have produced electro-optical devices on fabrics utilizing liquid crystal-polymer composites, as well as other existing display technologies. A few examples include a reflective cholesteric LCD fabricated by sequential coating of functional layers on fabric [A. Khan, et al., *SID Int. Symp. Deg. Tech. Pap.* 2006, 37, 1728], light emitting diode (LED) illuminated optical fibers woven into fabrics [V. Koncar, *Optics and Photonics News*, 2005, 16, 40], and organic-light-emitting-diode (OLED) coated fibers [K. Yase, et al., *SID Int. Symp. Dig,. Tech. Pap.*, 2006, 37, 1870]. Although these prototypes provide some degree of flexibility, they all negatively impact the physical characteristics of textiles, such as full flexibility and breathability. Conversely, incorporation of liquid crystal molecules directly into fibers may be a route to combine fiber/textile and optoelectronic properties of liquid crystals, wherein an electrospinning method was utilized in order to create ultrafine—and at the same time—optically responsive electro-optical composite liquid crystal fibers.

Polymeric fibers can be formed by a range of methods including melt spinning, melt blowing, wet spinning, gel spinning, dry-jet wet spinning, dry spinning and electrospinning. The method of fiber formation is chosen based on the properties of the polymer and the dimensions and physical properties desired in the final fibers. Secondary components including a second polymer or small molecule components can be incorporated into the fibers during the spinning process either as mixtures with the main polymer or in separate domains by methods known to those versed in the art of fiber spinning. Methods for forming bi-component fibers include coaxial spinning or extrusion and spontaneous phase separation during the spinning process.

The electrospinning method has been employed extensively to produce engineered fibers ranging from polymers to ceramics for various applications, including energy storage, tissue engineering, drug delivery, chemical and biological sensors, membranes, and filters. [D. H. Reneker, et al., *Polymer* 2008, 49, 2387; D. Li et al., *Journal of Membrane Science*, 2006, 279, 354, and D. Li, et al., *Polymer*, 2007, 48, 6340.] Electrospinning from solutions of polymers mixed with small molecules, such as isotropic liquids or liquid crystal materials, have been explored in recent times. For instance, the coaxial electrospinning of nematic liquid crystals and a poly(vinylpyrrolidone) (PVP)/$TiO_2$ sheath was recently reported by Lagerwall et al. [J. P. F. Lagerwall, et al., *Chem. Commun.*, 2008, 5420] Similarly, liquid crystalline polysiloxane with cholesterol side chain and small molecule liquid crystal was electrospun by Wu et al. [Y. Wu, et al., Colloid. Polym. Sci, 2008, 286, 897] to prepare liquid crystal fibers to create high performance materials. Electrospinning of liquid crystalline elastomers has also been studied for potential use as mechanical actuators because of the anisotropic physical properties associated with this class of materials.

SUMMARY OF THE INVENTION

It is, therefore, an object of present invention to produce a composite liquid crystal-polymer fiber by a) mixing at least one liquid crystal, one or more at least semitransparent polymers, and at least one solvent, b) processing said mixture in the presence of an voltage applied across a collection distance, c) phase separating said polymer from said liquid crystal, and d) encapsulating said liquid crystal with said polymer.

The fibers of the present invention comprise a polymer shell and a liquid crystal core that possess stimuli responsive electro-optical properties that are retained within the constrained geometry of the fiber. The polymer-liquid crystal composite fibers can be prepared via electrospinning. The diameter of the liquid crystal composite fiber ranges from about 10 nanometers to about 1.0 millimeter. These fibers are prepared by means of a high electric field gradient generated between a charged polymeric fluid and a collection plate. The encapsulated liquid crystal fibers of the present invention can be stimulated by an electrical field, a magnetic field, and to a lesser extent by thermal or photonic radiation.

BRIEF DESCRIPTION OF THE DRAWINGS

FIG. 8 is a POM image of PLA/5CB fibers (a) at nematic phase (below $T_{NI}$) and (b) at isotropic phase (above $T_{NI}$). Inset scale bars refer to 20 μm. A 50× objective was used. FIG. 8(c) relates to video frames showing isotropic to nematic phase transition of 5CB in PLA fibers (5CB/PLA), 58/42 wt %). These images were captured by MGI Video Wave 4 Software under the crossed polarizers during cooling of the sample. The bright region of the fibers (1) is at the nematic phase and the dark region of the fibers (2) is at the isotropic phase.

FIG. 9(a) is a POM image of a single PLA/5CB fiber collected at 6 cm, 0.6 mL/h, and 15.5 kV. Arrows 1 and 2 show the well-aligned 5CB molecules at the defect-free sites of the fiber, while arrow 3 indicates the Schlieren liquid crystal texture at the beaded part of the fiber.

FIG. 11 is a SEM micrograph of the PLA/5CB fibers collected at (a) 14 kV, (b) 20 kV, and (c) 22 kV. The feeding rate and collection distance are 0.6 mL/h and 10 cm, respectively.

DETAILED DESCRIPTION OF THE INVENTION

Figure 1A:
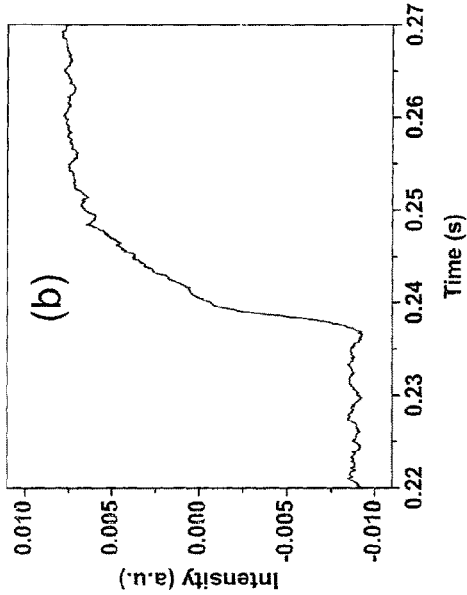
FIG. 1 is an illustration of typical electro-optical responses of the fibers upon application of an electric field under crossed polarizers; (a) and (c) show the applied voltage pulses of 120 V; (b) and (d) are the electro-optical curves of electrospun 5CB/PLA fibers, respectively; (b) show the response upon removal of the field; and (d) shows the response when the field is applied.
Figure 1B:
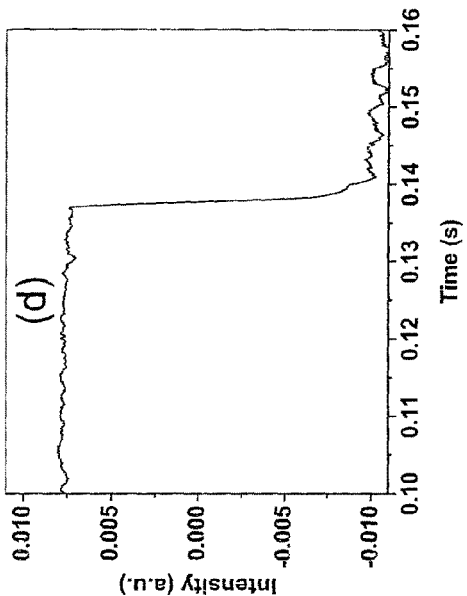
Figure 1C:
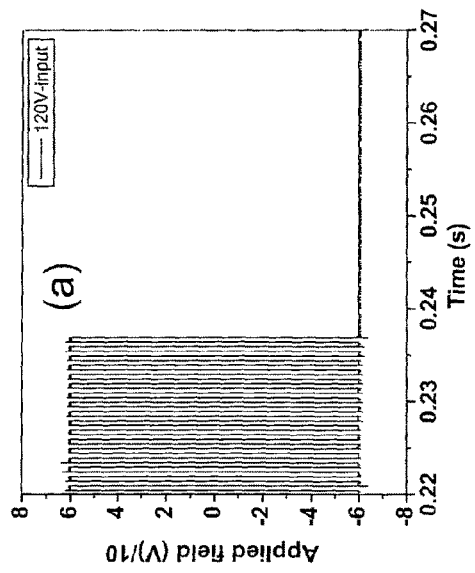
Figure 1D:
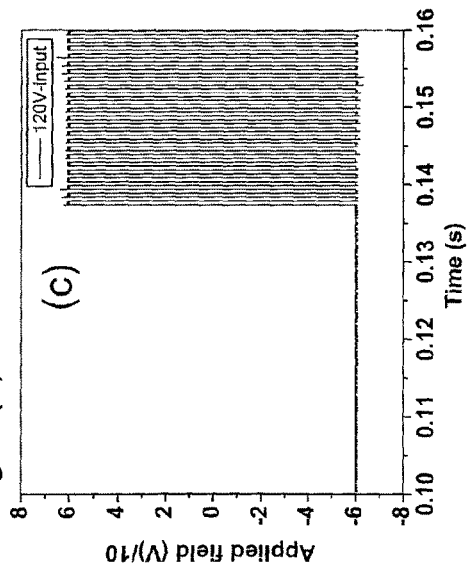

The fibers of the present invention containing one or more liquid crystals encapsulated within a shell made from one or more polymers are derived by a process wherein initially the one or more polymers but not necessarily the one or more liquid crystals are soluble or substantially soluble in one or more solvents. Such liquid crystals are known to the literature and to the art and generally include various mesomorphic compounds as either small molecule liquid crystal compounds or liquid crystal polymers.

Examples of small liquid crystal compounds include nematic compounds, for example 4-butyl-N-[methoxy-benzylidene]-aniline (MBBA), and 4-pentyl-4'-cyanobiphenyl (5CB); various cholesteric (chiral nematic) compounds such as cholesteryl benzoate, and cholesteryl pelargonate; various smectic compounds such as smectic A, smectic C, smectic C* (chiral smectic C), ferroelectric and antiferroelectric smectic mesophases, and higher order smectics such as B, E, G, H, J, and K-types; various liquid crystal compounds comprising a bent-core molecule, for example 1,3-phenylene bis[4-(4-n-octyloxyphenyliminomethyl) benzoate] (ref: Hideo TAKEZOE and Yoichi TAKANISHI, Japanese Journal of Applied Physics, Vol. 45, No. 2A, 2006, pp. 597-625), and 4-1-methyl-heptyloxycarbonyl-4'-phenyl-octyloxy-biphenyl-4-carboxylate (MHPOBC) (ref: Atsushi Suzuki, Hiroshi Orihara, Yoshihiro Ishibashi, Yuichiro Yamada, Norio Yamamoto, Kahoru Mori, Koji Nakamura, Yoshiichi Suzuki, Takashi Hagiwara, Ichiro Kawamura and Minoru Fukui, Jpn. J. Appl. Phys. 29 (1990) pp. L336-L338); various lyotropic liquid crystals such as the aqueous solution of Blue 27 (6,15-disulfonicacid-7,16-dichloro-indanthrone diammonium salt); various columnar mesophase compounds such as HAT (hexapentyloxytriphenylene); and various discotic liquid crystalline porphyrins; or any combination of the preceding. Desirably these liquid crystals have a low weight average molecular weight of about 200 g/mol to about 1000 g/mol and desirably from about 200 g/mol to about 800 g/mol. Examples of liquid crystal polymers include aromatic polyester polymers, poly(phenyleneterephthalamide), poly(p-phenylene) and its derivatives, aromatic polyamides. Suitable weight average molecular weights of the liquid crystal polymers range from about 3,000 to about 1,000,000 and desirably from about 100,000 to about 900,000. Examples of other liquid crystal and liquid crystal polymers are set forth in U.S. Pat. Nos. 4,684,477; 5,068,054; 5,178,791; 5,238,602; 5,254,747; 5,298,188; 5,370,820; 5,399,701; 5,457,235; 5,543,078; 5,567,349; 5,593,617; 5,629,055; 5,637,256; 5,650,534; 6,312,618; 6,570,632; 6,676,851; 6,689,290; 6,743,377; 6,793,986; 7,070,712; 7,416,682, and 7,442,475, all of which are hereby fully incorporated by reference.

The one or more polymers utilized to form the shell of a fiber are generally at least semi-transparent so that light incident upon the shell can be transmitted therethrough. By the term "at least semi-transparent" it is meant that at least about 50%, desirably at least about 60% or at least about 70%, and preferably at least about 80% or at least about 90% of light incident upon the polymer is transmitted therethrough in accordance with ASTM-D1003.

Numerous polymers can be utilized and include a polyurethane (PU), a polyethylene oxide (PEO), polyacrylonitrile (PAN), polyvinyl acetate (PVA), and a cellulose acetate; polyaniline, polypyrrole, polythiophene, polyphenol, polyacteylene, polyphenylene, poly(lactic acid) (PLA), poly(methyl methacrylate) (PMMA), poly(glycolic acid) (PGA), poly(ethylene oxide), polyacrylate, polyester, polyamide, polyolefin, polyvinylchloride (PVC), poly(amic acid), polyimide, polyether, polysulfone, and any combination thereof. Thus, blends of polymers and various copolymers can be utilized. Polymers with specific (hydrogen, ionic, and charge-transfer) interactions can also be used as the polymer component of the fiber.

Examples of preferred shell forming semitransparent or transparent polymers include polyacrylate, polyester such as polyethylene terephthalate (PET), polyolefins such as polyethylene, high density polyethylene, polypropylene, polysulfone, polyethersulfone (PES), polycarbonate (PC), cyclic olefin copolymer (COC), polyarylate, and polyimides, and their derivatives.

The relative amounts by weight of the one or more liquid crystals and the one or more polymers can vary with respect to each other with preferably the amount of the liquid crystals being a majority. The weight amount of the one or more liquid crystals can generally range from about 10% to about 90%, desirably from about 25% to about 85%, and preferably from about 40% to about 80% by weight based upon the total weight of the one or more liquid crystals and the one or more polymers. Naturally the amount by weight of the one or more polymers is the remaining percent by weight to add up to one hundred percent.

On occasion, if the liquid crystal and polymer do not degrade upon formation of a fiber as by electrospinning, then no solvent need be utilized. That is, in one embodiment, the amount of solvent is 0% by weight. However, an important requirement of the present invention is that very likely one or more solvents are utilized to dissolve the polymer but not necessarily the liquid crystal component of the mixture. Solvents are generally organic compounds and include various ketones such as acetone and methyl ethyl ketone; chloroform; dimethylfuran and tetrahydrofuran (THF); various alcohols having from 1 to about 9 carbon atoms such as methanol, ethanol, propanol, hexafluoro 2-propanol, and isopropanol; various amide compounds having from 2 to about 15 carbon atoms, such as N,N-dimethylformamide (DMF); and N,N-dimethyl acetamide (DMAc); water, various organic acids having from 1 to about 10 carbon atoms, such as formic acid and trifluoroacetic acid; various alkanes or halogenated alkanes having from about 6 to about 11 carbon atoms, such as dichloromethane, heptane, and hexane; mixtures thereof; and the like. The amount of the solvent can range widely with respect to the total weight of the one or more liquid crystals, the one or more polymers and the one or more solvents. Such solvent amounts are generally from about 1% to about 95% by weight, desirably from about 40% or about 60% to about 95% by weight, and preferably from about 80% to about 95% by weight based upon the total weight amount of the one or more liquid crystals, the one or more polymers, and the one or more solvents.

The liquid crystal-polymer mixture can be processed by electrospinning the mixture. Upon spinning the various mixtures of the liquid crystal and/or the liquid crystal polymer, and the light transparent shell polymer will separate and form different phases with the shell polymer encapsulating the liquid crystals.

Figure 6:
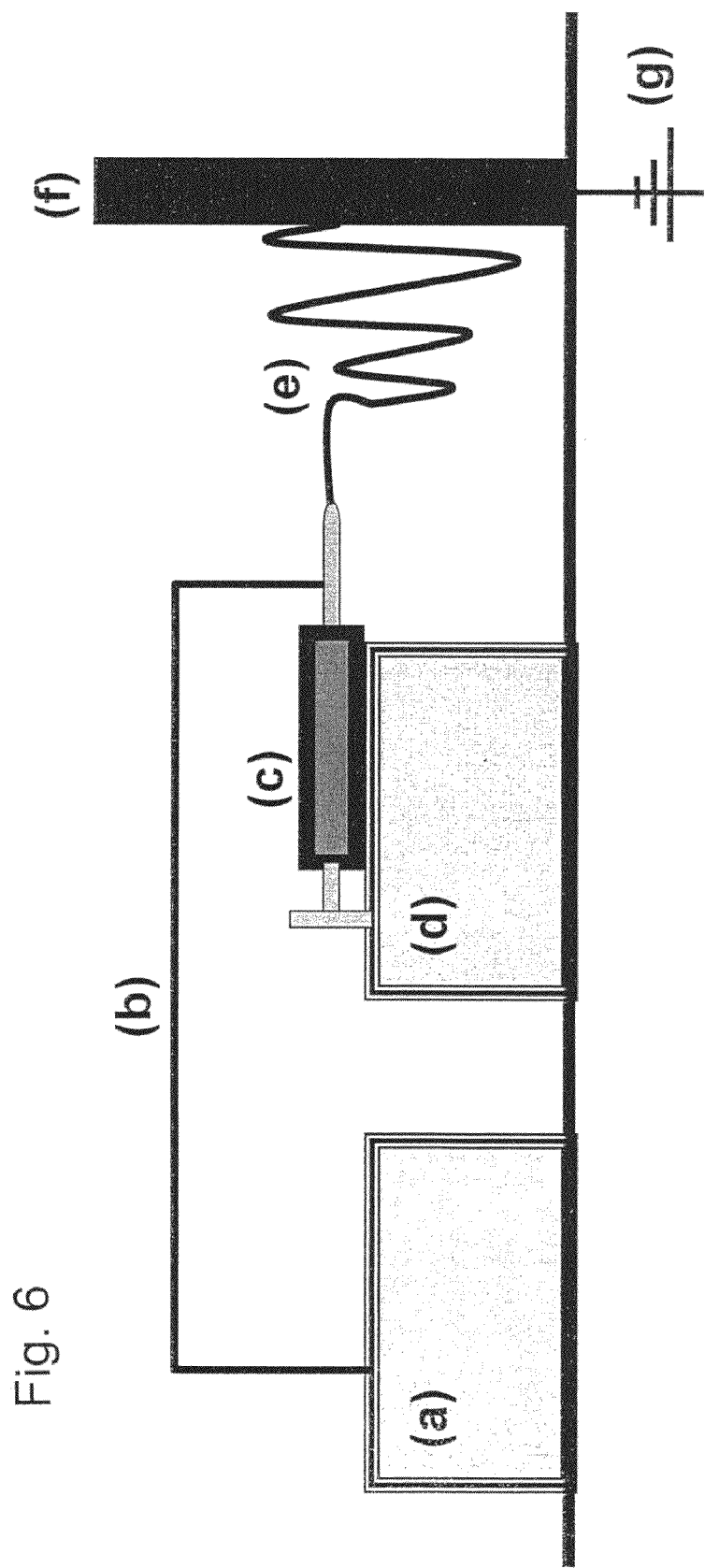
FIG. 6 is an illustration of one embodiment of the electrospinning set-up: a) a high voltage supply, b) connecting wires, c) a polymer solution dispenser (e.g. syringe), d) a syringe pump, e) electrospun fibers, f) a collection plate, and g) grounded wires.

Electrospinning is a method known to the art and to the literature and a general description thereof is set forth in U.S. Pat. No. 6,753,454; in WO 2005/024101 A1, in "Polymer Nanofibers Assembled by Electrospinning", Frenot et. al, Current Opinion in Colloid and Interface Science 8(2003), 64 75; and in "Nanostructured Ceramics by Electrospinning", Ramaseshan et al, Journal of Applied Physics 102,111101 (2007); all of which are hereby fully incorporated by reference. An example of an electrospinning device is schematically shown in FIG. 6 wherein (a) is a high voltage source that is connected as by wire (b) to a dispenser for the liquid crystal-polymer solvent mixture such as an injector or syringe (c). The liquid crystal-polymer-solvent mixture that is stored in container (d) is pumped therefrom into syringe (c) with a voltage charge being applied thereto. A voltage differential exists between injector or syringe (c) and a collection plate (f) (i.e. a collection distance) that is grounded at (g). In order to obtain suitable phase separation, a threshold voltage value or differential must be utilized that is generally 5 kV volts for most mixtures. Generally, the voltage differential can range from about 10 to about 50, desirably from about 10 to about 30 and preferably from about 10 to about 25 kV for most liquid crystal-polymer-solvent mixtures. Upon processing the mixture, that is ejecting the mixture from the ejector or syringe (c) the solvent component evaporates with the polymer phase separating from the liquid crystal and coalescing into a thread-like shape with the polymer coating or encapsulating the liquid crystal. The in situ formed liquid crystal core-polymer shell fiber is then collected on collection plate (f). In lieu of the collection plate, a rotating drum can be utilized whereby the fiber is wound around the drum. Subsequently, the fiber can be removed therefrom for various end uses as set forth hereinbelow. The distance between the tip of the injector or syringe and the collection plate or rotating drum is generally from about 1 to about 100 centimeters, desirably from about 3 to about 25 centimeters, and preferably from 5 to about 20 centimeters. The thickness of the fiber will vary and can be controlled by various factors such as the diameter of the injector through which the liquid crystal-polymer-solvent mixture is extruded or ejected, by the amount of the solvent contained within the mixture, and by the collection rate if a rotating drum is utilized whereby the fiber is drawn. The thickness of the liquid crystal encapsulated fiber can vary as from about 10 nanometers to 1.0 millimeters, desirably from about 100 nanometers to about 100 microns, and preferably from about 250 nanometers to about 10 microns.

The collection or target plate can generally be of any size and shape, and can be flat or for example, in the form of a rotating drum. The collection plate is electrically conductive and hence made of a conductive material or have a conductive coating or material thereon. Suitable collection plates can be made from various metals such as iron, steel, aluminum, copper, nickel, zinc, and the like. Alternatively, they can contain a non-conductive substrate and have a conductive coating thereon such as any of the above noted metals. Suitable substrates generally include any type of glass or plastic. Moreover, transparent coating layers can be utilized such as compositions containing indium-tin-oxide or antimony-tin-oxide. The collection plates can also be made of conducting polymers such as PEDOT:PSS or Poly(3,4-ethylenedioxythiophene)poly(styrenesulfone), poly(thiophene)s, poly(acetylene)s, poly(pyrrole)s, poly(p-phenylene vinylene)s, and also electrically conducting fabrics such as conducting polymer coated fabrics, such as poly(pyrrole) coated fabrics as well as fabrics containing a metal conductor therein such as metal fibers as for example iron, copper, aluminum, etc.

Stated in different words, the liquid crystal core-polymer shell fibers of the present invention can be manufactured by means of a high electric field gradient generated between a charged polymeric-liquid crystal-solvent fluid and a collection plate, where the viscosity of the polymer solution is tuned to form a Taylor cone at and above the above-noted threshold field. When the applied voltage reaches a critical value, electrostatic forces overcome the surface tension of the polymer solution as at a metallic needle tip. As a result, an electrically charged jet is emanated towards the collection plate. While the jet elongates towards the target in usually a spiral path as a result of the electrically driven bending instabilities induced by Coulomb interactions, the solvent evaporates and electrospun fibers are deposited as a nonwoven mat. Since the polymer solution is a homogeneous mixture of the liquid crystal, the polymer, and the solvent, upon electrospinning and evaporation of the solvent, the liquid crystal phase exceeds its solubility limit in the polymer and precipitates with the polymer encapsulating it. The various parameters, such as collection distance, applied voltage, feeding rate, as well as the material characteristics of polymers (e.g. molecular structure and weight) and polymer solutions (e.g. viscosity, conductivity, and surface tension) are used to optimize the morphology of the electrospun fibers.

Various additives in effective amounts to achieve one or more desired properties can be utilized provided that they generally do not interfere with the formation of a polymeric shell and a liquid crystal core. Various dyes can thus be utilized such as positive and/or negative dichroic dyes, photo-reactive dyes, and dopants. Various surfactants such as one or more cationic, anionic, or nonionic surfactants or mixtures thereof can be utilized to promote dissolution of the polymer and/or liquid crystals within the solvent. Various particles, such as macromolecules and colloidal particles can also be utilized such as polystyrene, barium titanate, lead zirconate titanate, as well as metals to improve electrical, thermal, mechanical, and optical properties of the fibers. Other particles such as generally metal particles can be utilized to enhance the color of the fibers such as gold, silver, carbon, copper, chrome, iron, nickel, and zinc particles, and the like, or various minerals. Colorant dyes can also be utilized such as various azo dyes and fluorescent dyes that are known to the art and to the literature. Often it is desirable to utilize various adhesives to increase adherence of the fibers with regard to various substrates or other fibers. Other additives include one or more biological materials that can be utilized incorporated onto or within the fiber such as chemical markers, membranes, proteins, nucleic acids, cellular components, tissues. Still another class of additives that can be utilized comprise quantum dots and C-dots.

The invention will be better understood by reference to the following examples which serve to illustrate, but not to limit the present invention.

EXAMPLES

The electrospinning apparatus comprises a high-voltage supply (Gamma High Voltage Research Inc., FL), a programmable syringe pump (KDS Model 100), and a collection plate. Collection plates can include a copper plate, a diamond-shaped Aluminum mesh, ITO-coated glass substrates (Corning, 1.1 mm thick), and a cover slip (Fisher Scientific, 0.1 mm thick) attached to the copper plate. The 5 mL glass syringe (Popper Micro-mate) was purchased from VWR Scientific (West Chester, Pa.). The electrospinning unit was arranged in a horizontal fashion to collect fibers onto a collection plate placed at 6 cm to 12 cm distance from the needle tip.

Materials:

Polylactic acid (PLA) was supplied by Cargill Dow LLC (Minnetonka, MN). Chloroform, acetone, dimethyl formamide (DMF), and poly(methyl methacrylate) (PMMA) were purchased from Sigma-Aldrich (St. Louis, Mo.) and used without further purification. Commercially available 4-pentyl-4-cyanobiphenyl (5CB), E7, CB15, i.e. p-NC—$C_6H_4$—$C_6H_4$—$CH_2CH(CH_3)C_2H_5$, and CE2, i.e. a chiral nematic. p-$CH_3CH_2CH(CH_3)CH_2$—$C_6H_4$—$C_6H_4$—COO—$C_6H_4CH_2CH(CH_3)CH_2CH_3$, liquid crystals were obtained from Merck Licristal EM Chemicals.

Example 1

Electrospinning of PLA/5CB

The electrospun composite fibers of PLA/5CB were prepared as follows. First, PLA and 5CB of 42/58 weight percent were mixed together, and chloroform/acetone solvent (3:1 volume ratio) was added later. The PLA/5CB/solvent mixture was stirred on a heating plate (Fisher Model 210T) for a day at room temperature. The concentration of PLA in chloroform/acetone solvent was 7.3 wt % for the samples. Next the polymer solution was drawn into the syringe and injected with a metal needle using a syringe pump. Both pure PLA and PLA/5CB fibers were electrospun with a metallic needle of 24 gauge (0.41 mm in diameter). The electric potential difference (10 kV–22 kV), the collection distance (6 cm–16 cm), and the feeding rate (0.1 mL/h–1 mL/h) were varied to modify the morphology of the composite fibers.

Materials and Methods

For electro-optical characterization, 5CB/PLA (58/42 wt %) fibers were elctrospun onto an indium-tin-oxide (ITO) coated glass (Corning 1.1 mm thick) substrate at 20 kV, 10 cm, and 0.6 mL/h. Later, an ITO coated glass was used as a top substrate to assemble the cell.

A square wave alternating current (AC) electric field was supplied by a function generator (Hewlett Packard 33120A, 15 MHz) and a wideband amplifier (FLC electronics F20 AD). An electric field was applied to the cells via ITO electrodes. The intensity variation was measured through a photodiode placed at an eyepiece of an Olympus microscope (Olympus, BX60) by keeping the illumination and the magnification constant. The 10× microscope objective was used to collect and signal. The optical response characteristics of the fibers and the voltage pulse were monitored by a picometer and a PC picometer oscilloscope software from Pico Technology Ltd. Finally, all the results were digitally saved to the computer.

Results and Discussion

Electro-Optical Characteristics of the Fibers Under Crossed Polarizers

The LC core in the electrospun 5CB/PLA fibers (58/42 wt %) can be electrically switched upon application of an AC-electric field. 1 kHz square waveform was produced repetitively in a burst mode by means of a function generator. The pulse duration was 100 milliseconds, i.e. the function generator sends a voltage pulse with a frequency of 1 kHz for a period of 100 milliseconds and switches off the 100 ms. The amplitude of the voltage pulse was varied from 0 to 180 V.

FIG. 1 shows a typical electro-optical response of the fibers at the voltage pulses of 120 V. FIGS. 1(a) and (c) are the applied square waveforms, which were monitored by a picometer, and the corresponding electro-optical responses were obtained from fibers under crossed polarizers and plotted in FIGS. 1(b) and (d), respectively. FIG. 1(b) shows the response upon removal of the field. FIG. 1(d) shows the response when the filed was applied. When the field was applied the transmitted intensity reaches a minimum value indicating that LC molecules align along the field and therefore block the transmission of light.

When the field was removed, LC molecules realign back to its equilibrium director configuration in the fiber core that is generally perpendicular to the polymer surface and light is readily transmitted through the liquid crystal. Thus, optical microscopy images indicate that 5CB aligns parallel to the surface of PLA. The alignment of 5CB is PLA is the result of the surface anchoring effect and the polymer structure of the fiber. In addition, the response characteristics of fibers depend on liquid crystal material parameters, such as elastic constants, dielectric constants, and viscosity.

Figure 2:
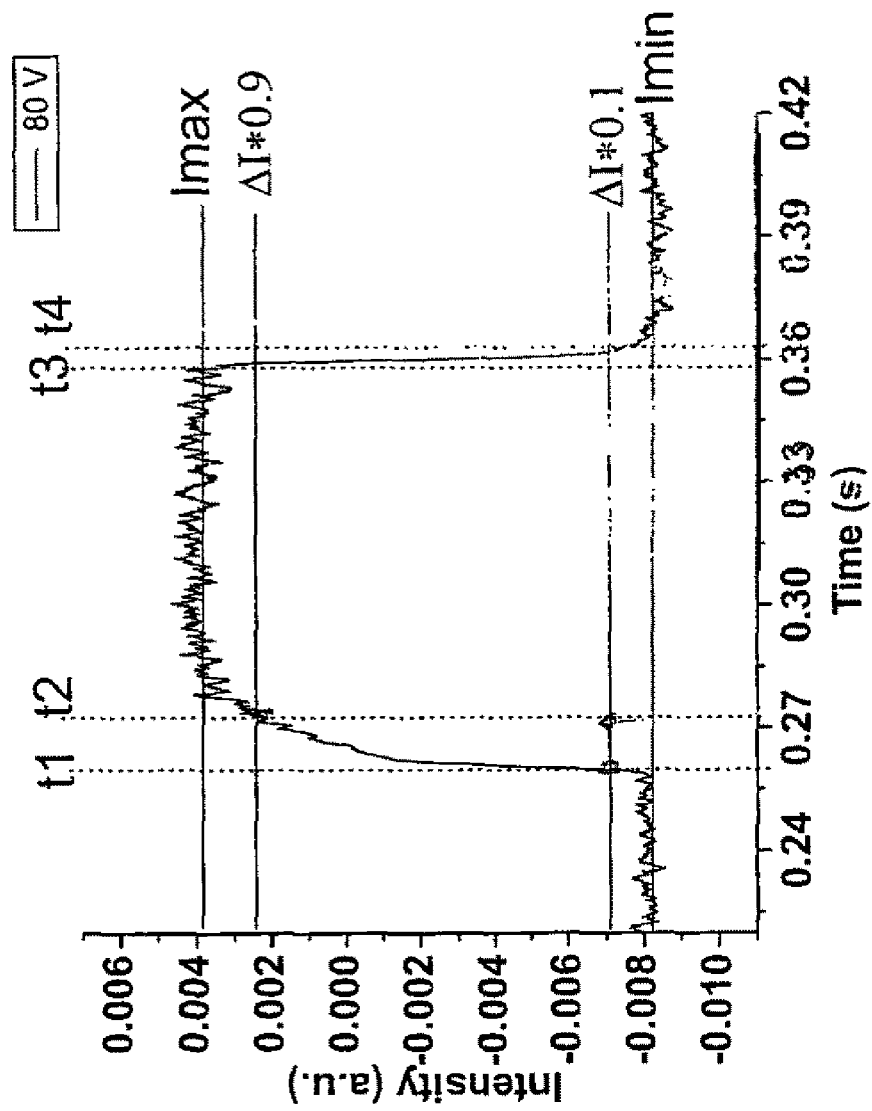
FIG. 2 is an illustration of the response time characteristics of the fibers, where time ON is t4-t3 and time OFF is t2-t1; ΔI is the difference between maximum and minimum intensity.
Figure 3:
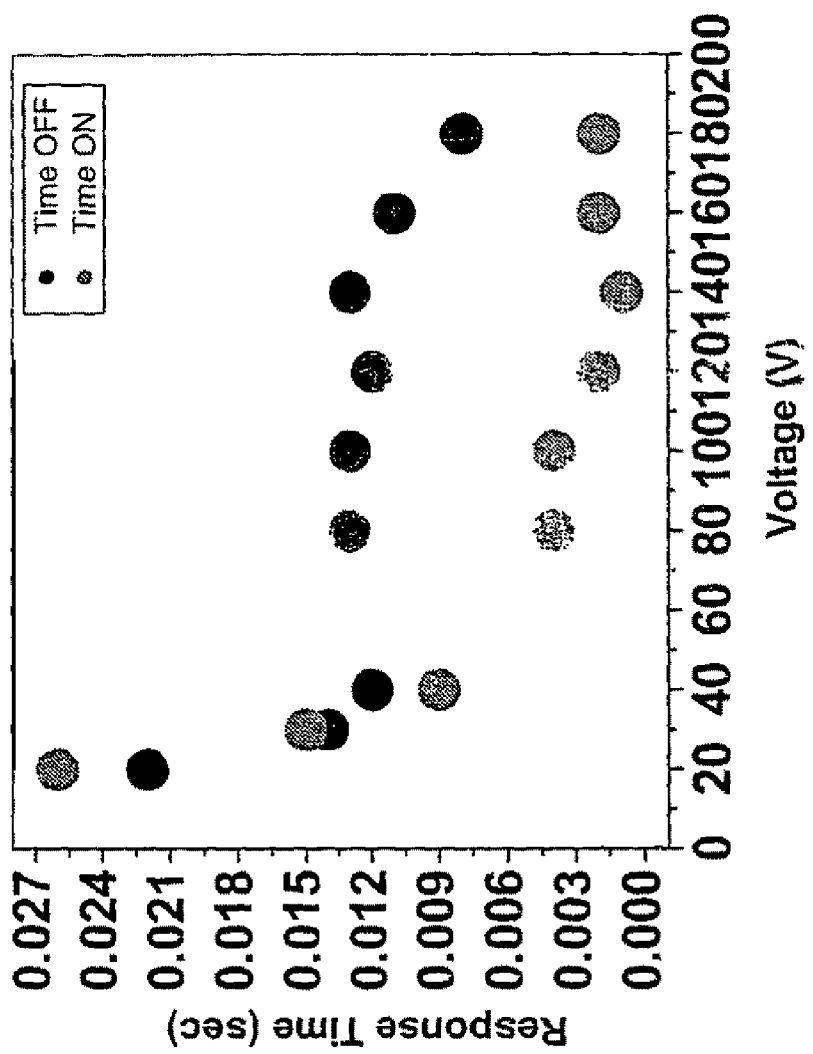
FIG. 3 is an illustration of response time characteristics as a function of an applied voltage for electrospun 5CB/PLA fibers.

Time OFF or relaxation time and time ON or switching time values were calculated based on a 90% change in the light intensity ($\Delta I*0.9$) and a 10% change in light intensity ($\Delta I*0.1$) as illustrated in FIG. 2, where $\Delta I$ is the difference between maximum and minimum intensity ($\Delta I=Imax-Imin$). The maximum intensity was obtained when the field was zero, but the minimum intensity was obtained when the field was applied. It was observed that switching time values decrease with increasing applied voltage as suggested by the theory for polymer dispersed liquid crystal systems (ref: B. Wu, et al., Liquid Crystals, Vol. 33, Nos. 11-12, 2006, pp. 1315-1322). Moreover, the relaxation times decline upon removal of field. This indicates the effect of polymer structure on the reorientation of LC molecules and the interaction between the polymer sheath and the non-reactive LC molecules. The degree of interaction and the electro-optical characteristics of fibers can be modified by changing the polymer type, surface characteristics, or the type of LC molecule. (ref: R. A. M. Hikmet, Chapter 3, pp 53, in "Liquid Crystals in Complex geometries", Taylor & Francis Ltd., 1996, Eds. G. P. Crawford and S. Zumer). FIG. 3 shows the response time characteristics of the fibers as the magnitude of the field was changed. As seen, the saturation voltage is about 80 V. The switching time upon application of 80 V is 4 milliseconds, while the relaxation time upon removal of the voltage is 13 milliseconds.

Figure 4:
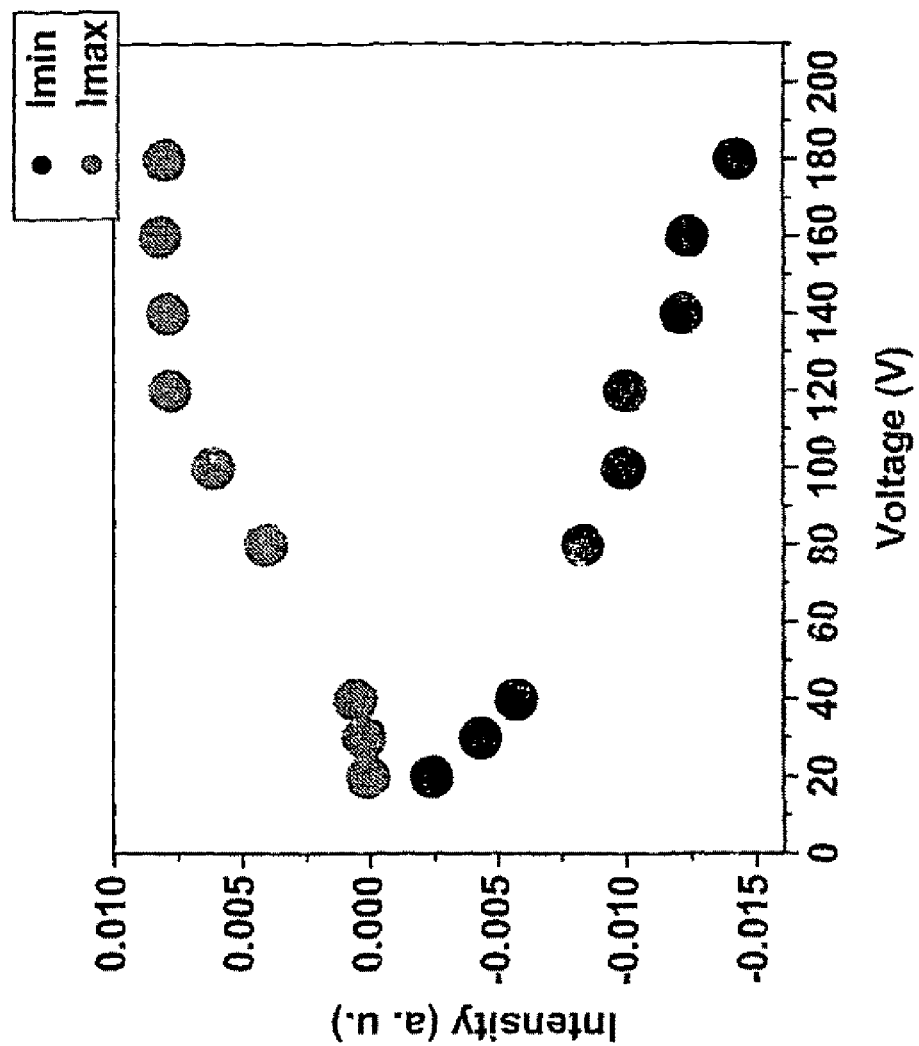
FIG. 4 is an illustration of the field-induced light transmission characteristics of the fibers; Imin is obtained at the "ON" state when the field is applied and Imax is obtained at the "OFF".
Figure 5:
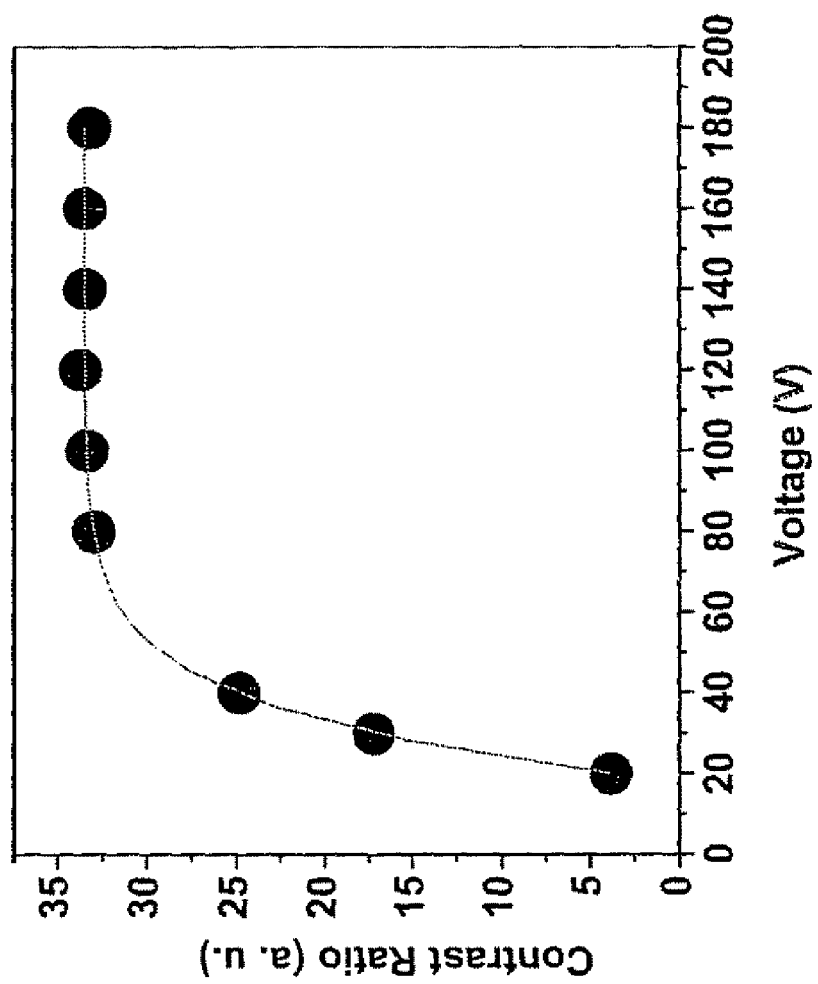
FIG. 5 is an illustration of the relative contrast ratio as a function of an applied voltage of the liquid crystal fibers.

The field-induced light transmission characteristics of the fibers under crossed polarizers were also studied. From FIG. 4 it can be seen that the measured maximum and minimum intensity values (arbitrary units) as a function of the peak voltage amplitude (0 to 180 V) are significantly different. The relative contrast ratio was also calculated by dividing the intensity value of the ON state to that of the OFF state and plotted in FIG. 5. A constant was added to the intensity ratio in order to offset the curve in the plot. The contrast ratio increases with the magnitude of the applied field and becomes constant above saturation voltage 80 V. The transparency of the fibers did not change as the voltage was increased further.

In summary, it is apparent that the application of electric field to the fibers reorients the liquid crystal areas in the fibers. The results also demonstrate that liquid crystal/polymer fibers can be used as light modulating fibers upon application of external stimuli.

Example 2

Electrospinning of PLA/Cholesteric Liquid Crystal Mixture

The electrospun composite fibers of PLA/cholesteric liquid crystal were prepared as follows. First, cholesteric liquid crystal mixture was prepared from E7/CB15/CE2 with a weight ratio of 59/29/12. Next, PLA and cholesteric liquid crystal was mixed together (45 to 55% by weight ratio), and chloroform/acetone solvent (3:1 volume ratio) was added later. The PLA/cholesteric liquid crystal-solvent mixture was stirred on a heating plate (Fisher Model 210T) for a day at room temperature. The concentration of PLA in chloroform/acetone solvent was 7.3 wt % for the samples. Next the polymer solution was drawn into the syringe and injected with a metal needle using a syringe pump. Both pure PLA and PLA/cholesteric LC fibers were electrospun with a metallic needle of 24 gauge (0.41 mm in diameter). The electric potential difference (10 kV–22 kV), the collection distance (6 cm–16 cm), and the feeding rate (0.1 mL/h–1 mL/h) were varied to modify the morphology of the composite fibers. While the flow rate of the polymeric fluid was kept at 0.6 mL/h, the collection distance and the applied voltage were varied from 6 cm to 16 cm and from 9 kV to 22 kV, respectively.

Example 3

Electrospinning of PMMA/5CB

The electrospun composite fibers of PMMA/5CB were prepared as follows. First, PMMA and 5CB of 50/50 were mixed and DMF solvent was added later. The PMMA/5CB/DMF mixture was stirred on a heating plate (Fisher Model 210T) for a day at room temperature. The concentration of PMMA was 25% by weight in DMF. Next the polymer solution was drawn into the syringe and injected with a metal needle using a syringe pump. PMMA/5CB fibers were electrospun with a metallic needle of 24 gauge (0.41 mm in diameter). The electric potential difference (10 kV–22 kV), the collection distance (6 cm–16 cm), and the feeding rate (0.1 mL/h–1 mL/h) were varied to modify the morphology of the composite fibers.

Nematic phase of liquid crystals is one of the mesophases of liquid crystals without any positional order. The rod-like shaped nematic liquid crystals, such as 5CB, form an orientationally ordered uniaxial phase with a unit director n, representing the average direction of the elongated molecules. The flexible end chains in 5CB allow the molecules to move around while the rigid core favors alignment. Additionally, in nematic phase liquid crystals molecules are free to turn about their axis (continuous rotational symmetry around n). The formation of the liquid crystal phase for 5CB depends solely on temperature, and these types of liquid crystals are classified as thermotropic. Therefore, the liquid crystal properties of composite fibers were determined by observing the phase transition characteristics of confined 5CB in the fiber. Most importantly, it was observed that some of the liquid crystal domains inside the fibers can be electrically switched upon the application of an AC-electric field.

The invention will be better understood by reference to FIGS. 6 through 20 wherein the noted polymer encapsulated fibers were made in accordance with the present invention.

Figure 7A:
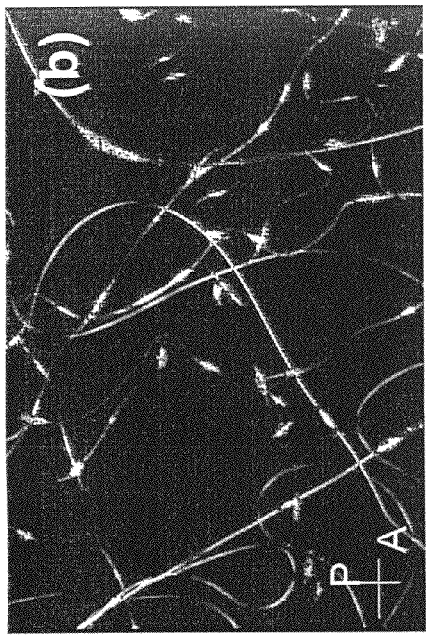
FIG. 7 is a POM (Polarized Optical Microscopy) texture of (a) pure PLA and (b) PLA/5CB (42/58%) fibers collected at 6 cm, 0.6 mL/h, and 15.5 kV. (c) and (d) are the images of (a) and (b), respectively, obtained under parallel polarizers. Inset scale bars refer to 50 μm. A 20× objective was used.
Figure 7C:
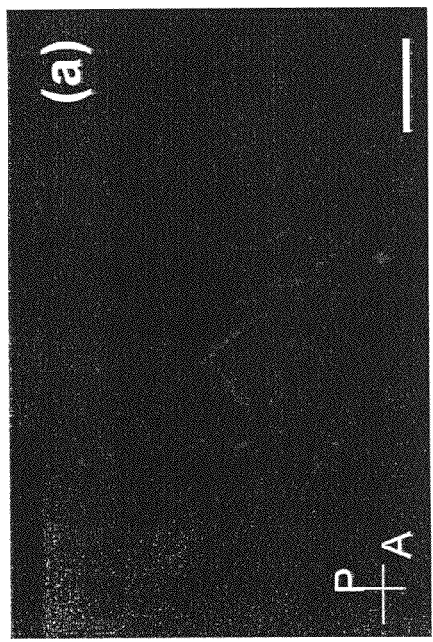
Figure 7D:
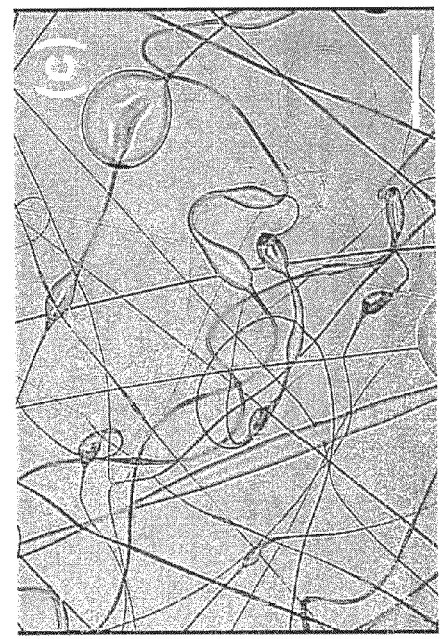

For electrospinning, first PLA and 5CB were mixed at a 42 to 58 weight ratio, and later, chloroform/acetone solvent (3:1 volume ratio) was added. The homogeneous solution was obtained by a constant stirring of the PLA/5CB in chloroform/acetone solvent mixture at room temperature. Later, this polymer solution was electrospun at room temperature. In order to compare the effect of 5CB on PLA fiber morphology, pure PLA was electrospun at identical processing conditions. The illustration of electrospinning set-up is shown in FIG. 6. The POM image of electrospun PLA fibers, as shown in FIG. 7a, does not show optical anisotropy (birefringence), and appears completely dark under crossed polarizers regardless of the orientation of pure PLA fibers. On the contrary, the incorporation of 5CB into PLA solution results in the formation of optically anisotropic and light scattering electrospun liquid crystal fibers at room temperature (FIG. 7b), indicating that the nematic mesophase of 5CB is preserved after electrospinning. The beaded fiber morphology is observed for both pure PLA and PLA/5CB fibers, as shown in FIGS. 7c and 7d, respectively, where the polarizers are set parallel. The optical textures within PLA/5CB fibers, in fact, originate from change in orientation of optically anisotropic rod-like 5CB molecules, which has a high birefringence of 0.20 at 25° C. In the POM (Polarized Optical Microscopy) images of PLA/5CB fibers, the spatial variation in light intensity is the result of the variation in the phase change of light traversing the sample, where the birefringence of the sample is integrated over the path of light on the plane of observation. This physical characteristic of liquid crystal materials allow for the visualization of the director field n, or the macroscopic molecular orientation, of the thin films. It is apparent that the composite PLA/5CB fibers shown in FIG. 7b possess liquid crystal characteristics. The nematic phase inside the bead structure is also identified from the optical texture composed of bright and dark brushes with topological defects, known as Schlieren texture, appearing under crossed polarizers. In this specific liquid crystal texture, dark brushes appear whenever n or its horizontal projection orients parallel or perpendicular to one of the polarizers.

In order to prove that liquid crystal molecules were confined in the core of PLA shell fibers, the phase transition from isotropic to nematic phase was recorded. At 25° C., PLA/5CB beaded fibers exhibit nematic phase under crossed polarizers, as seen in FIG. 8a. When the samples are heated up to 45° C. (well above $T_{NI}$), the optical anisotropy, and therefore the birefringent texture of nematic phase, disappears and nematic to isotropic phase transition occurs. In an isotropic phase, 5CB becomes an orientationally disordered liquid phase (FIG. 8b). It was observed that the nematic mesophase reformed in the cavities of PLA on cooling down the sample below $T_{NI}$. When the samples were cooled down from an isotropic phase at a rate of 0.1° C./min, nematic to isotropic phase transition temperatures for pure 5CB and PLA/5CB fibers were observed at 36.6° C. and 32.8° C., respectively. Video frames of the isotropic to nematic phase transition in these fibers were captured by MGI Video Wave 4 Software and shown in FIG. 8c during an 18 sec. time interval.

Figure 9C:
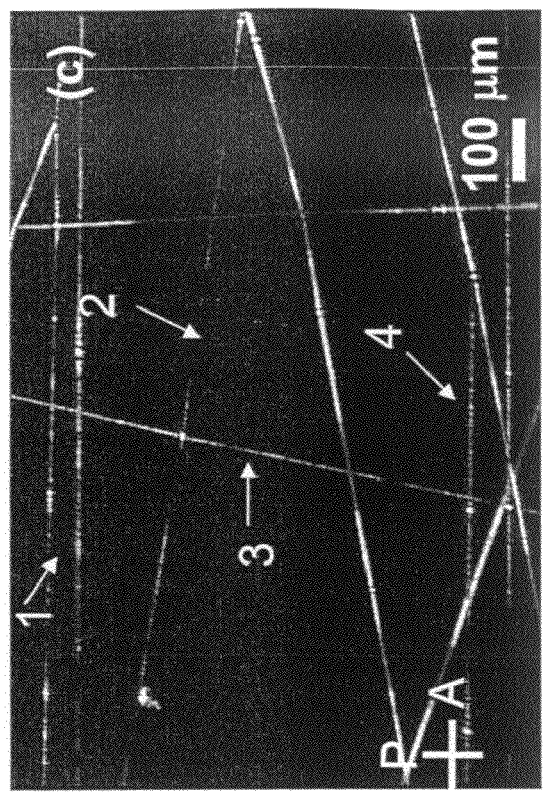
FIG. 9(c) shows the fibers rotated 45° with respect to polarizer (P) and analyzer (A). Fibers shown from 1 to 4 by an arrow show a couple of examples for alignment sensitive light polarization characteristics of the fibers.
Figure 9B:
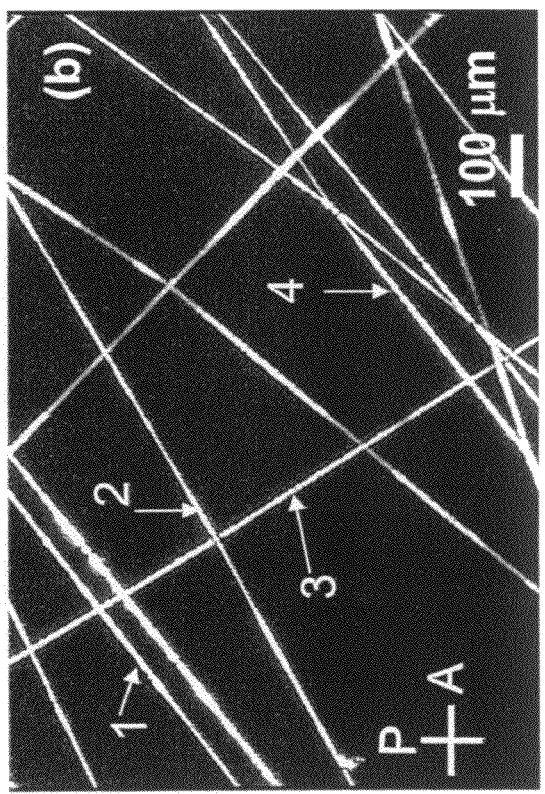
FIG. 9(b) relates to the electrospun 5CB/PLA fibers as seen under POM.
Figure 10A:
FIG. 10 are POM images of PLA/5CB fibers collected at 0.6 mL/h, 10 cm, and (a)-(d) 14 kV, (b)-(e) 20 kV, (c)-(f) 22 kV. Top row: a 10× objective was used and inset scale bars indicate 100 μm. Bottom row: a 50× objective was used and inset scale bars indicate 20 μm.
Figure 10B:
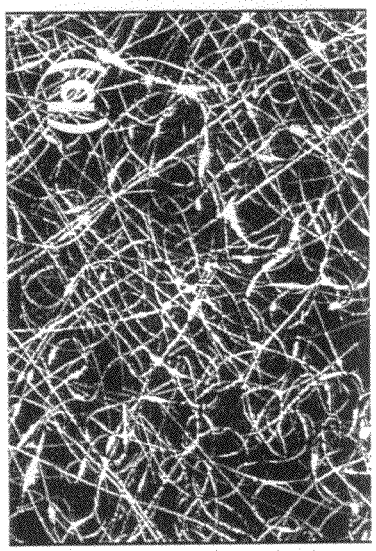
Figure 10C:
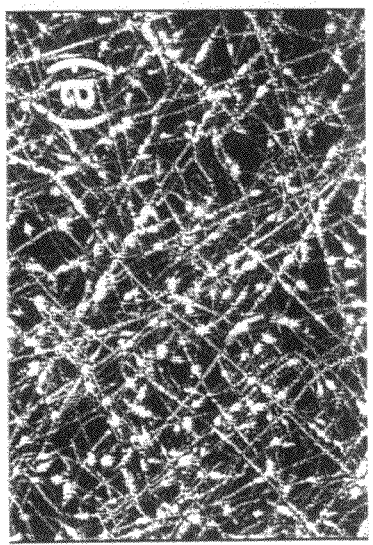
Figure 10D:
Figure 10E:
Figure 10F:
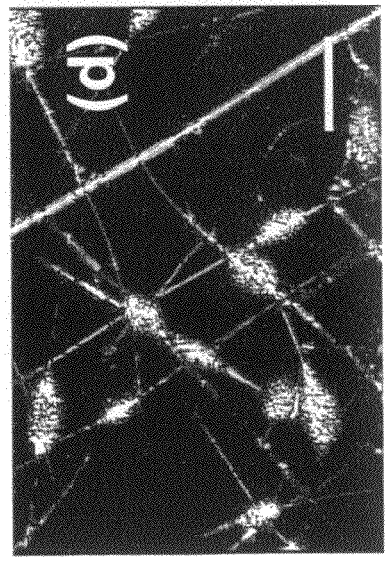

It is well known that in confined geometries, the alignment of the nematic liquid crystal depends on the interaction of the liquid crystal molecules with the confining boundaries. The degree of disturbance of the director field n varies depending on the anchoring strength of the surfaces and the boundary conditions in confined geometries. For instance, planar boundary conditions orient n parallel to the bounding surfaces. In general, the director configuration of the nematic liquid crystal inside a few micrometer curved structure of polymer binders is affected by the elastic forces competing with molecular anchoring at the surface of polymer. The director configuration of 5CB liquid crystal constrained in the core of the PLA fibers was studied by analyzing birefringent textures with POM. For that purpose, a single PLA/5CB fiber elongated at different directions on the plane of observation was chosen. As shown POM image of the fiber in FIG. 9, the bright liquid crystal texture was observed at arrow 1 because n is oriented between crossed polarizers, while the dark texture at arrow 2 was observed because n is oriented with the direction of the analyzer. Therefore, the defect-free part of the cylindrical channels of PLA fibers (<3 μm) clearly imposes planar or tangential anchoring for 5CB on its surface and aligns n uniformly along the fiber long axis. On the other hand, the uniformity of the liquid crystal alignment was altered by increasing the radius of the cavity (>3 μm) as shown in the beaded part of a fiber (arrow 3), where the orientation of the director field was arbitrary. Randomly constrained orientational order also leads to the formation of a Schlieren liquid crystal texture indicating that 5CB molecules are anchored planar to the surface. FIGS. 9b and 9c also show that the rotation of the alignment of the 5CB/PLA fibers rotates the polarization direction of the light under POM. Sample fibers are denoted from 1 to 4. In FIG. 9c, the sample was rotated 45° with respect to one of the polarizers. FIG. 9 also shows that light transmission through the fibers depends on the orientation angles of the polarizers relative to the LC alignment in the fiber. More detailed information on the electromagnetic propagation in liquid crystals can be found in various textbooks. Consequently the uniform alignment of 5CB molecules in the core of the fibers strongly depends on the size and morphology of PLA fibers.

It was found that even though the change in the collection distance (6 cm to 16 cm) did not result in any major difference in fiber size, shape, and uniformity (not shown), the variation in an applied voltage (14 kV to 22 kV) altered the morphology of the composite liquid crystal fibers significantly, as shown in POM images of PLA/5CB fibers (FIG. 10(*a-f*)) taken with 10× and 50× objectives. For these samples, the concentration of 5CB, the feeding rate of the polymer solution, and the collection distance were kept at 58 wt. %, 0.6 mL/h, and 10 cm, respectively. Particularly, the application of higher voltages above the threshold voltage (~14 kV) generated noticeable change in the size and shape of liquid crystal fibers, as illustrated in SEM images of the fibers (FIG. 11). The length to width ratio of the beads on fibers was increased approximately from 2.0 to 4.0 as the applied voltage was increased from 14 kV to 20 kV. As the applied voltage was raised further to 22 kV, the beads become very small in size, but the diameters of the fibers increased significantly to include 58% 5CB in the core of the fiber, as seen in FIGS. 10c and 10f and FIG. 11c. According to POM images, the sizes of the some of the fibers are doubled when the applied voltage was increased from 14 kV to 22 kV (FIG. 10d-f). These results prove that the size and shape as well as liquid crystal texture in composite liquid crystal fibers can be modified by changing the electrospinning parameters.

Figure 12A:
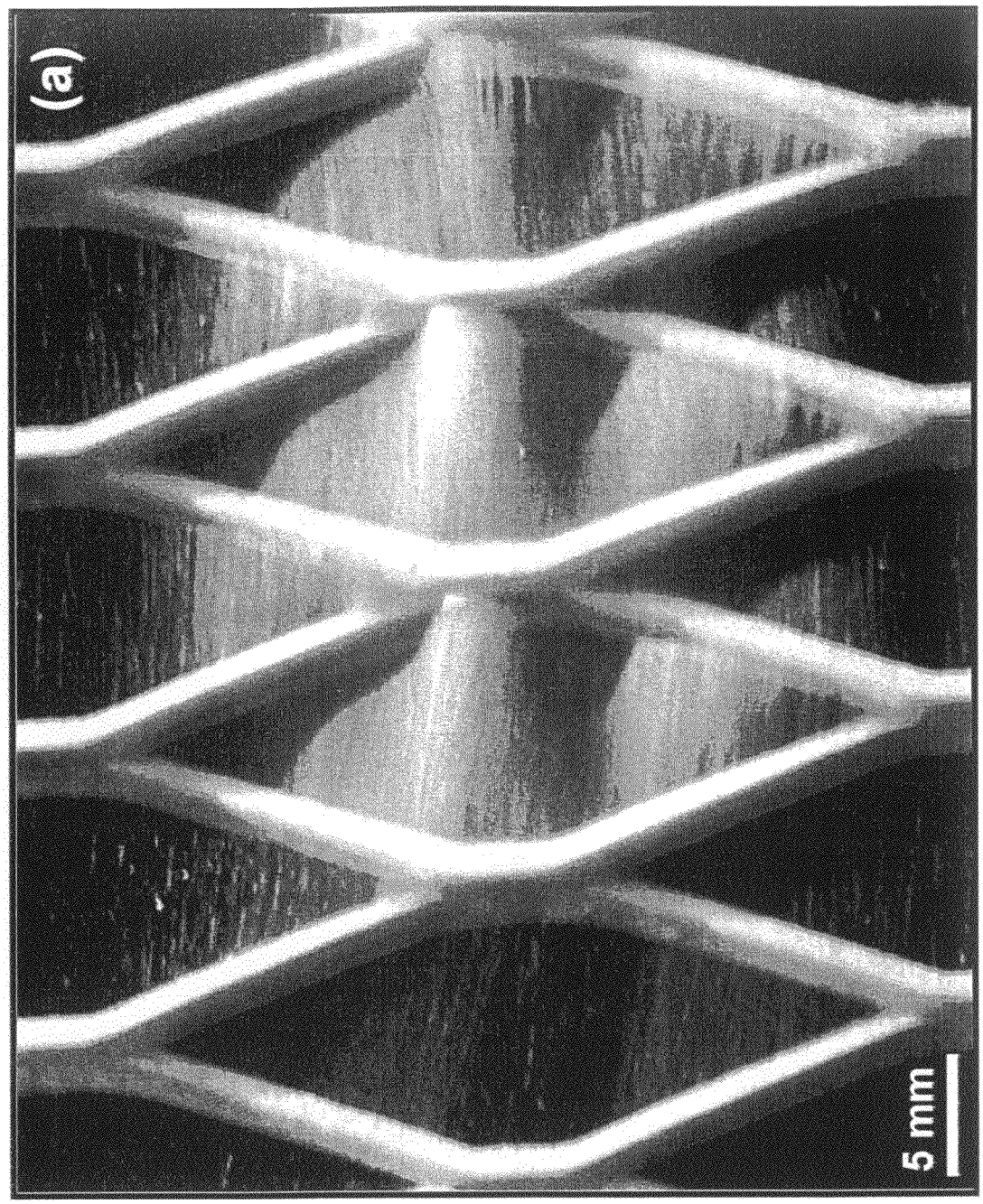
FIG. 12 is a (a) Picture of oriented pure PLA fibers collected onto an aluminum grid. (b) Picture of oriented PLA/5CB fibers shown between crossed polarizers. (c) POM image of oriented PLA/5CB fibers shown in (b), where the average direction of the long axes of fibers N is located 45° to crossed polarizers. (d) The image shown in (c) is rotated where N is oriented along the polarizer. A 5× objective is used.
Figure 13E:
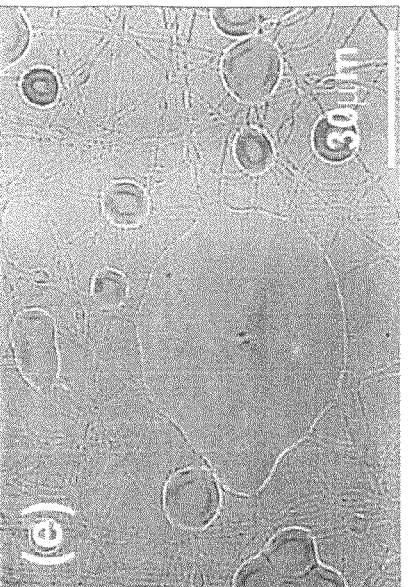
FIG. 13 is a POM images of PMMA/5CB liquid crystal fibers shown between (a) crossed polarizers and (b) parallel polarizers, where a 10× microscope objective is used. The same fibers are seen with 50× microscope objective where the images are taken under (c) crossed polarizers, (d) the polarizer is placed 75° to the analyzer, and (e) parallel polarizers. These fibers are collected at 0.25 mL/h, 8 cm, and 14 kV.
Figure 13D:
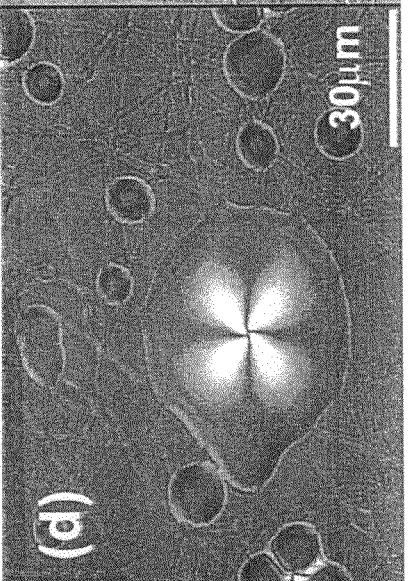
Figure 13C:
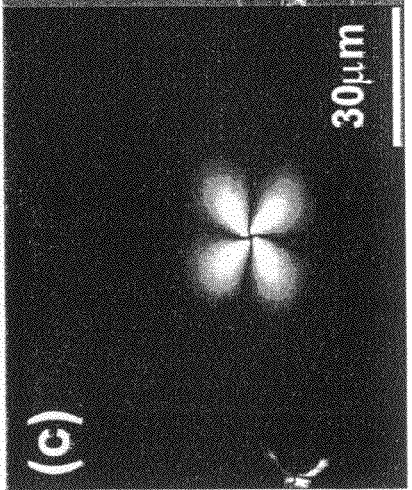
Figure 13B:
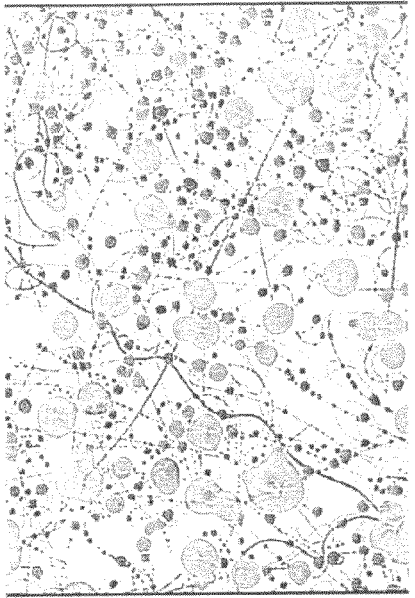
Figure 13A:

Another important aspect of these composite liquid crystal fibers is the ability to control not only the morphology, but also the average orientation of the composite liquid crystal fibers. Light modulating fibers were produced by creating well-oriented composite fibers composed of PLA and birefringent LCs. This result was achieved by electrospinning them onto a diamond shape Aluminum collector, between grids, as shown in FIG. 12a for pure PLA fibers. The spatial arrangements of the average direction of the long axes of the oriented fibers show some variation due to the shape of the collector at the edges. Likewise, oriented PLA/LC fibers were electrospun onto the collector as shown in FIG. 12b between crossed polarizers. POM images of PLA/5CB fibers in FIG. 12c further clarify the organization for this new class of composite fibers. In oriented PLA/5CB fiber arrays, the maximum light intensity was obtained when the average direction of the long axes of fibers N was set 45° to crossed polarizers (FIG. 12c), while the minimum intensity was observed if N was oriented along one of the polarizers (FIG. 12d). Keeping constant the illumination and the 5× magnification, the OM images of both orientations were computer digitized and normalized (100% refers to a white image) and the contrast ratio (CR) for the oriented composite liquid crystal fibers was determined. The CR is defined as the ratio of the average gray level for the scattering state (FIG. 12c) to the average gray level for the extinction state (FIG. 12d). The CR value was calculated as 2.0 for the oriented liquid crystal fibers, where the average gray levels were 22.2% and 11.1%, respectively. It is apparent that the bead-free fibers are very sensitive to the polarization direction of the light. However, the polarization sensitivity of the composite liquid crystal fiber array lessens because of the residual light scattering emanating from bead defects located along the fiber long axis. Consequently, the polarization efficiency of the composite liquid crystal fibers not only depends on the packing order and the size of the fiber, but also the morphology of the fiber, the birefringence of the liquid crystal material, and the degree of orientation of n inside the fiber. Nonetheless, the results demonstrate that highly oriented electrospun liquid crystal-polymer fibers can potentially be used as optical filters or as a scattering polarizer once the structure is optimized to form defect-free fibers.

Electrospinning of PMMA/5CB/DMF has resulted in completely different fiber morphology and liquid crystal alignment in the core of PMMA fiber, as shown in polarizing optical microscopy images in FIG. 13. FIG. 13a relates to liquid crystal fibers shown between (a) crossed polarizers and (b) parallel polarizers, where a 10× microscope objective was used. The same fibers are seen with a 50× microscope objective where the images are taken under (c) crossed polarizers, (d) the polarizer is placed 70° to the analyzer, and (e) parallel polarizers. These fibers are collected at 0.25 mL/h, 8 cm, and 14 kV. This example shows that liquid crystal alignment in the cavities of fiber can be manipulated not only by varying the electrospinning process parameters, but also by changing the type of polymer. In addition to types of polymer, different liquid crystal mesophases were tested, such as cholesteric liquid crystal phase, to obtain different electro-optical effects.

Figure 14A:
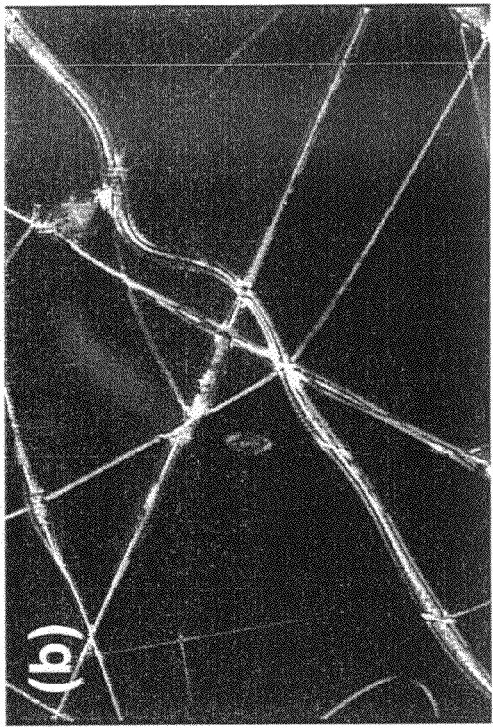
FIG. 14 is a a) POM images of PLA/cholesteric liquid crystal fibers collected at 0.6 mL/h, 8 cm, and 9 kV. POM images are taken with a 20× microscope objective under a) crossed polarizers in the reflective mode, b) crossed polarizers in the transmissive mode, c) parallel polarizers in the transmissive mode. The fibers images are also taken with a 50× microscope objective under d) crossed polarizers in the reflective mode, e) crossed polarizers in the transmissive mode, f) parallel polarizers in the transmissive mode.
Figure 14B:
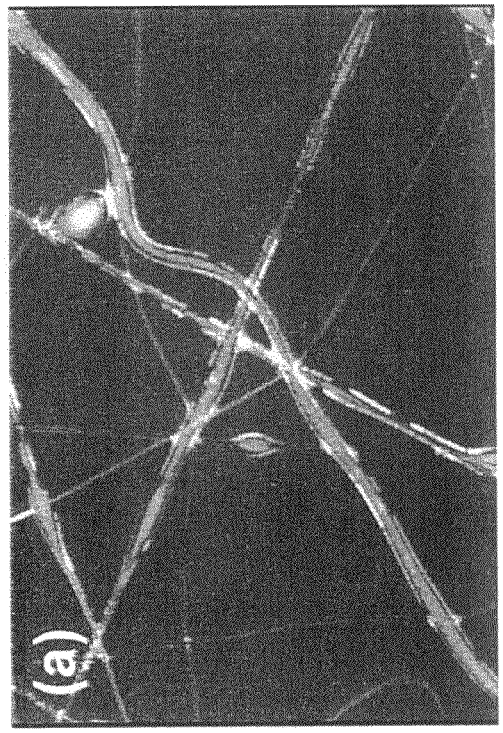
Figure 14C:
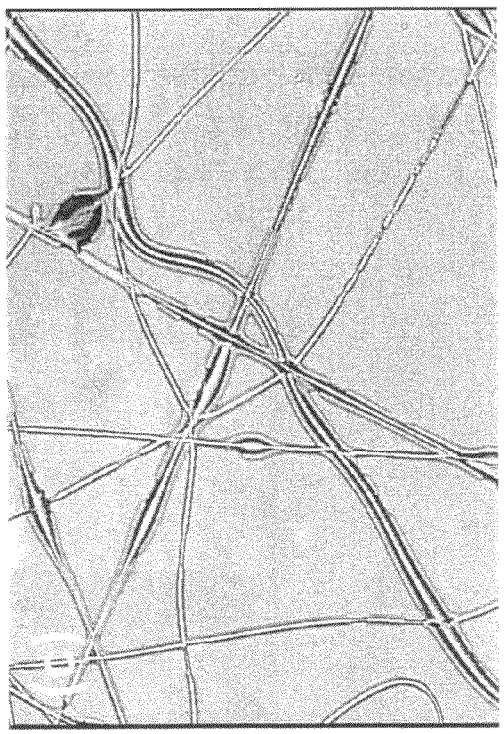
Figure 14E:
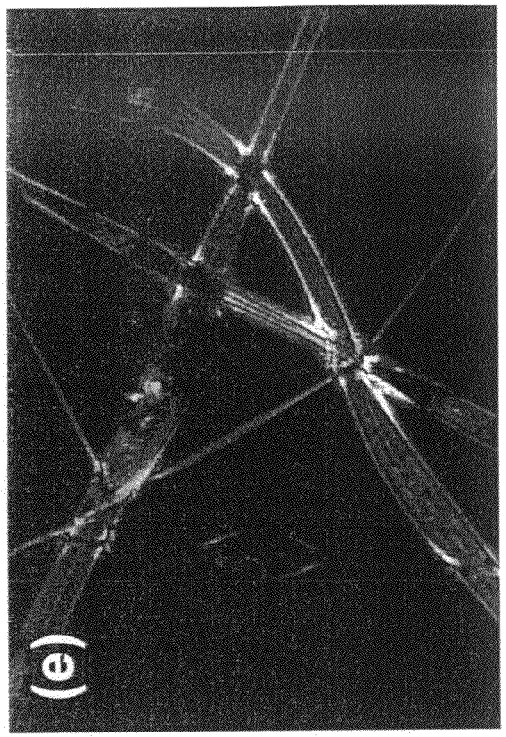
Figure 14D:
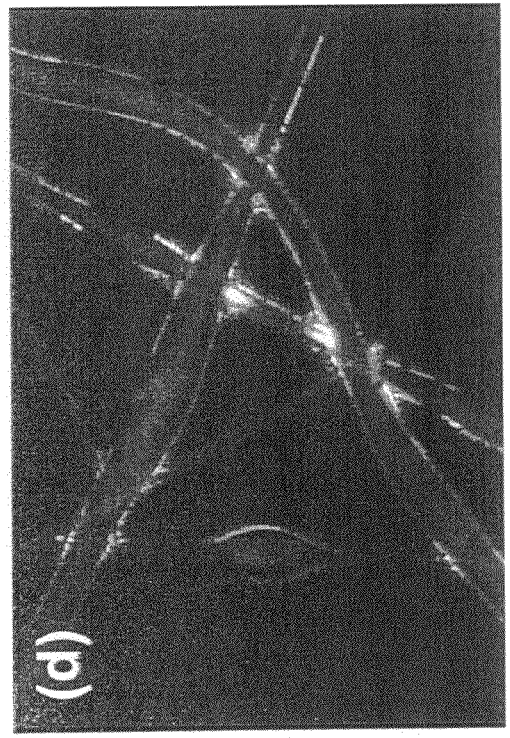
Figure 14F:
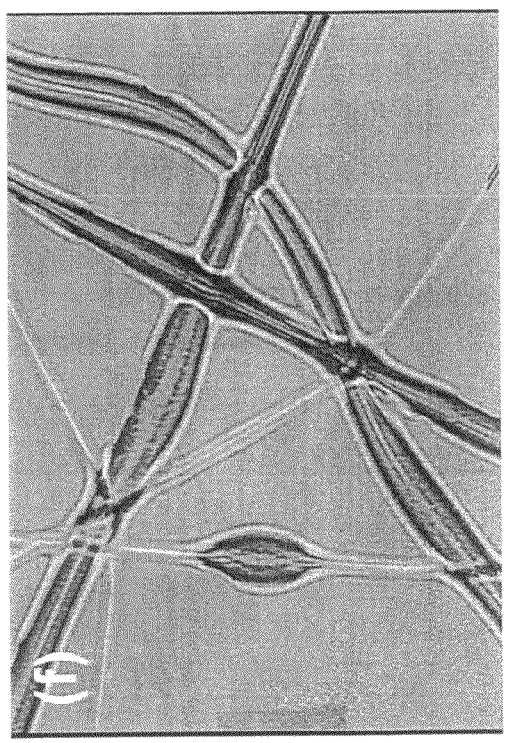
Figure 15A:
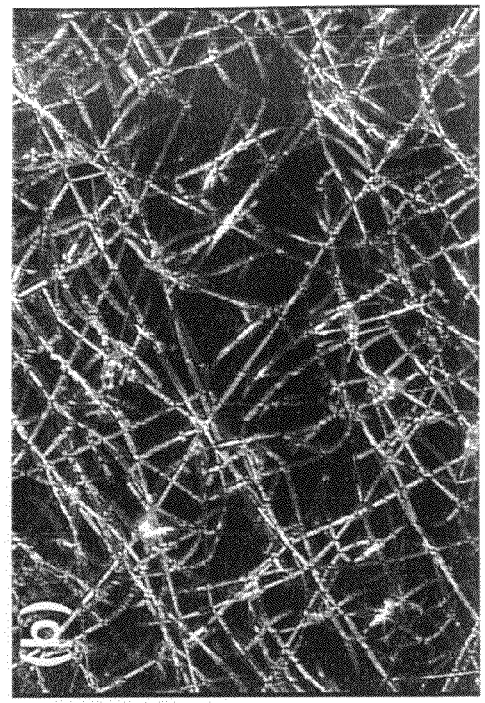
FIG. 15 are POM images of PLA/cholesteric liquid crystal fibers collected at 0.6 mL/h, 16 cm, and at a) 10 kV, b) 18 kV, and c) 22 kV. Same PLA/cholesteric liquid crystal fiber images were taken under crossed polarizer in the reflective mode: d) 10 kV, e) 18 kV, and f) 22 kV. A 20× microscope objective is used.
Figure 15B:
Figure 15C:
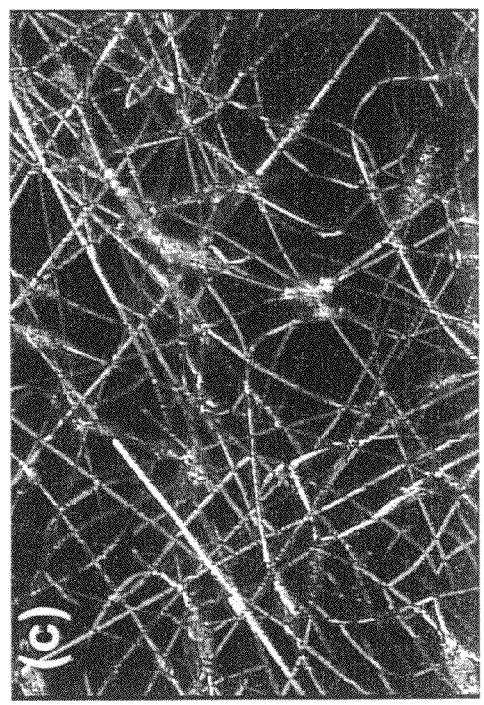
Figure 15E:
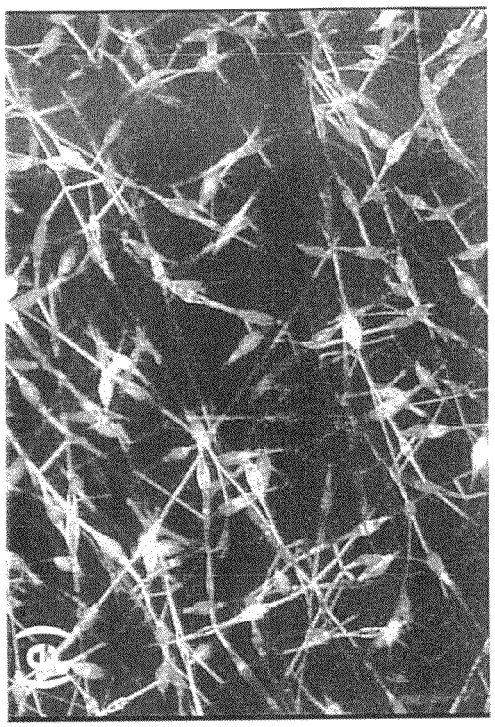
Figure 15D:
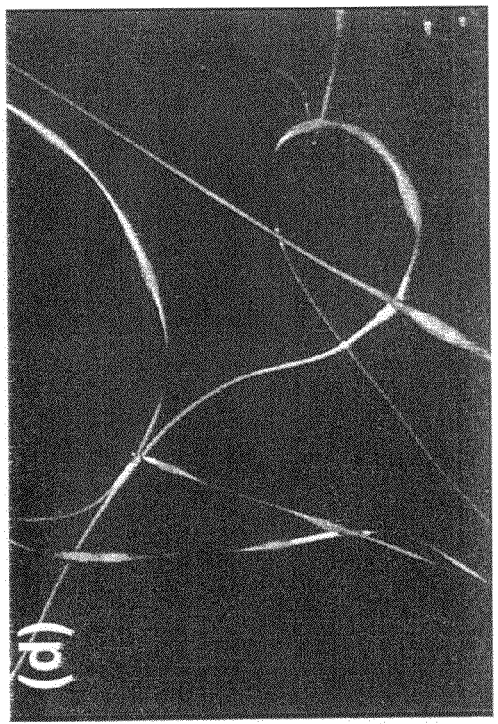
Figure 15F:
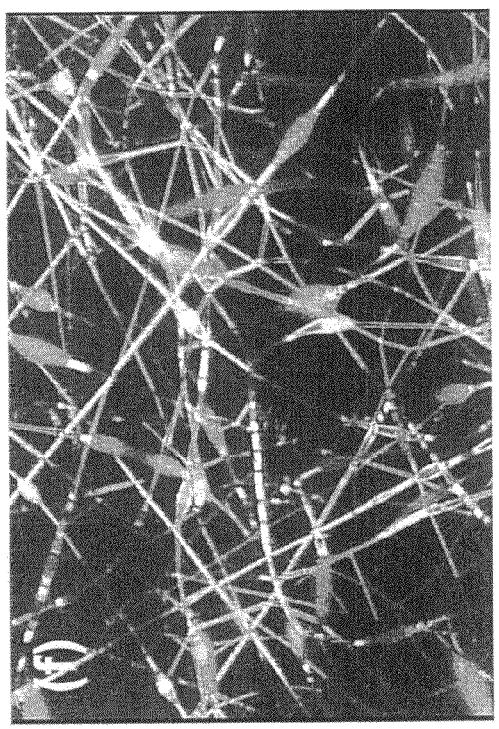
Figure 16:
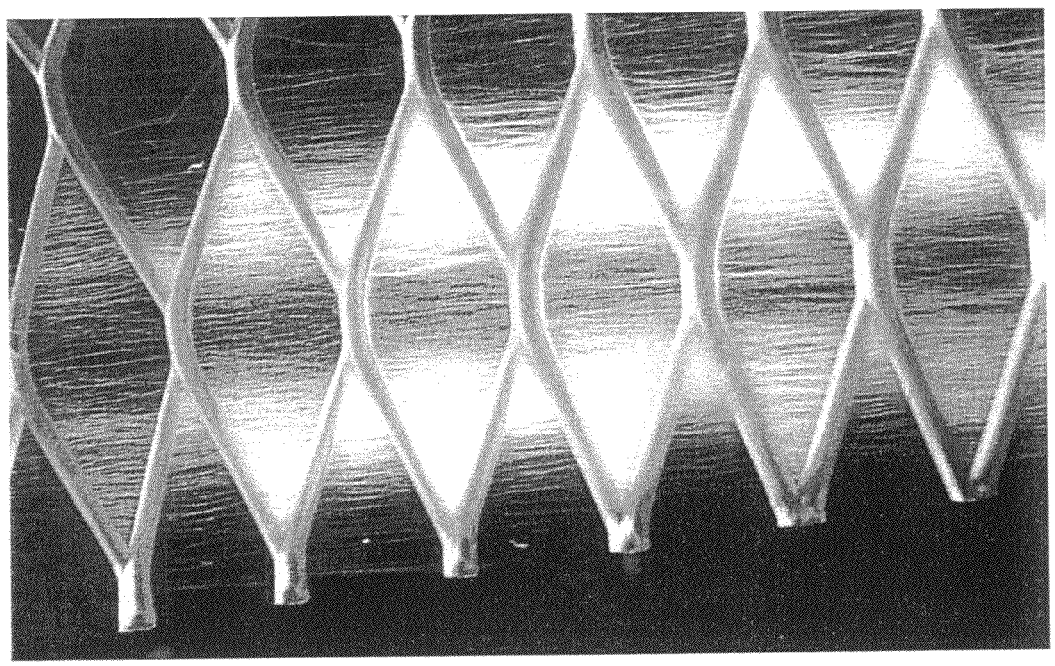
FIG. 16 is a picture of oriented electrospun PLA/cholesteric liquid crystal fibers shown between crossed polarizers.

The cholesteric phase (N*) is a chiral type of nematic phase (N), where the director field n rotates about the cholesteric helical axis c with a translation of $P\alpha/2\pi$. P is called the cholesteric pitch length, where the director rotates through $2\pi$ radians, and $\alpha$ is the rotation angle. P is twice the periodicity along the c because n and −n are indistinguishable. In order to construct a reflective cholesteric liquid crystal composite fiber, the formation, shape, liquid crystal texture and orientation of the electrospun fibers were investigated. The concentration of the cholesteric liquid crystal was kept at 55 wt. % in PLA solution. Electrospinning process was carried out at room temperature. It was found that below critical voltage (10 kV), the phase separation process during electrospinning process resulted in partial encapsulation of liquid crystal material in the core of the fibers as seen in FIGS. 14a and 14b. Some of the liquid crystal material was located at the outside of the fibers. Above 10 kV, the phase separation process was complete and liquid crystal material was completely encapsulated in the core of PLA (FIG. 14c). The fiber images were also taken with a 50× microscope objective under d) crossed polarizers in the reflective mode, e) crossed polarizers in the transmissive mode, and f) parallel polarizers in the transmissive mode. The effect of the applied voltage on the structure of the liquid crystal/polymer composite fibers is shown in FIG. 15 wherein POM images of PLA/cholesteric liquid crystal fibers collected at 0.6 mL/h, 16 cm, and at a) 10 kV, b) 18 kV, and c) 22 kV. POM image of the same PLA/cholesteric liquid crystal fiber were taken under a crossed polarizer in the reflective mode at: d) 10 kV, e) 18 kV, and f) 22 kV. A 20× microscope objective is used. PLA/cholesteric liquid crystal fibers are also collected onto an aluminum collector to obtained oriented fibers as shown in FIG. 16 between crossed polarizers.

Some of the examples for embodiments of core shell liquid crystal-polymer composite fibers are shown from FIG. 17 to FIG. 20. A detailed explanation of these examples is set forth below.

In summary, it was demonstrated that the self-assembly of liquid crystal molecules occur in the core of the polymer shell containing fibers at above some threshold voltage. The uniqueness of this system is that both liquid crystal and polymer components are dissolved in the same solvent to form a single solution, and concurrently, are electrospun to form a composite fiber with phase separated hybrid structure. Moreover, in this structure the liquid crystal component was encapsulated in the cavities of the polymeric shell with preserved mesophase characteristics. It is also demonstrated that well-controlled orientation of liquid crystal composite fibers and size and well-preserved liquid crystal mesophase core characteristics in specific positions and orientations can be manufactured via an electrospinning method.

The fibers of the present invention can be used to produce high-tech fibers. It is promising that an electrospinning method will pave its way to create new liquid crystal composite fibers to be constructed as interactive fabrics. Moreover, the physical and chemical characteristics of the liquid crystal-polymer fibers can be tailored with additives—such as dyes, chiral molecules, ferroelectric and ferromagnetic particles, organic and biological molecules—as well as with other mesophases—such as bent core liquid crystals, smectic liquid crystals, ferroelectric liquid crystals, columnar phase forming liquid crystals, and lyotropic liquid crystals. The optomechanical and optoelectronic properties of the liquid crystal fibers can also be manipulated by introducing liquid crystal elastomers into the fiber structure. The inner surface characteristics of the polymer carrier can also be altered to change surface anchoring strength and to induce a specific type alignment of liquid crystal molecules (tangential, tilted, or homeotropic anchoring) in the core of fiber.

These bendable liquid crystal-polymer optical fibers and nonwoven mats can also be engineered to form materials and devices, responding to chemical changes, thermal and mechanical effects, as well as the application of electric and magnetic fields. The fibers can be utilized in variety of photonic applications ranging from optical sensors to light modulating devices operating in the UV-VISIBLE to IR regions of the electromagnetic spectra. The polymeric encapsulated liquid crystal fibers of the present invention can also be utilized as light scattering polarizers as well as light modulating devices. The fibers of the present invention can also be further processed or modified to change the overall functionality of the fiber such as with respect to physical and chemical characteristics of the surface of the fibers as well as with respect to fibers having different conductivity, color, shape, air permeability, luster, repellent or absorbent characteristics, mechanical properties, and elastic properties. Additionally, the chemistry of the fiber can be changed to detect other chemicals presents in the surrounding environment by observing texture, color, or shape changes. Reflective mode of cholesteric liquid crystal mesophase can also be used to form high-tech fabrics functioning as a thermo-optic device embedded or woven into clothing.

Figure 17:
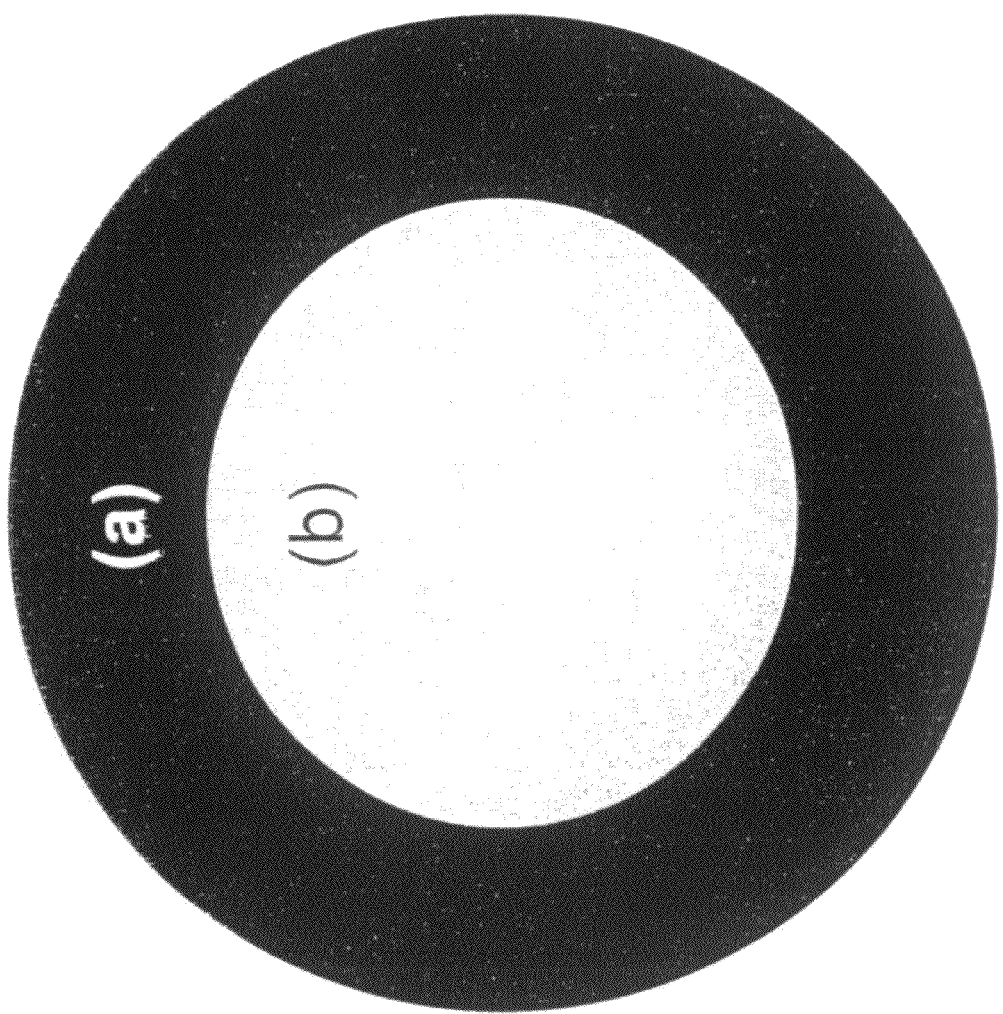
FIG. 17 is a typical structure for a core/shell liquid crystal-polymer composite fiber, where the cross section of the fiber is shown and the composite fiber comprises a) a polymer shell and b) a liquid crystal core layer. The liquid crystal core can be composed of small molecule liquid crystal materials or liquid crystalline polymers.
Figure 18:
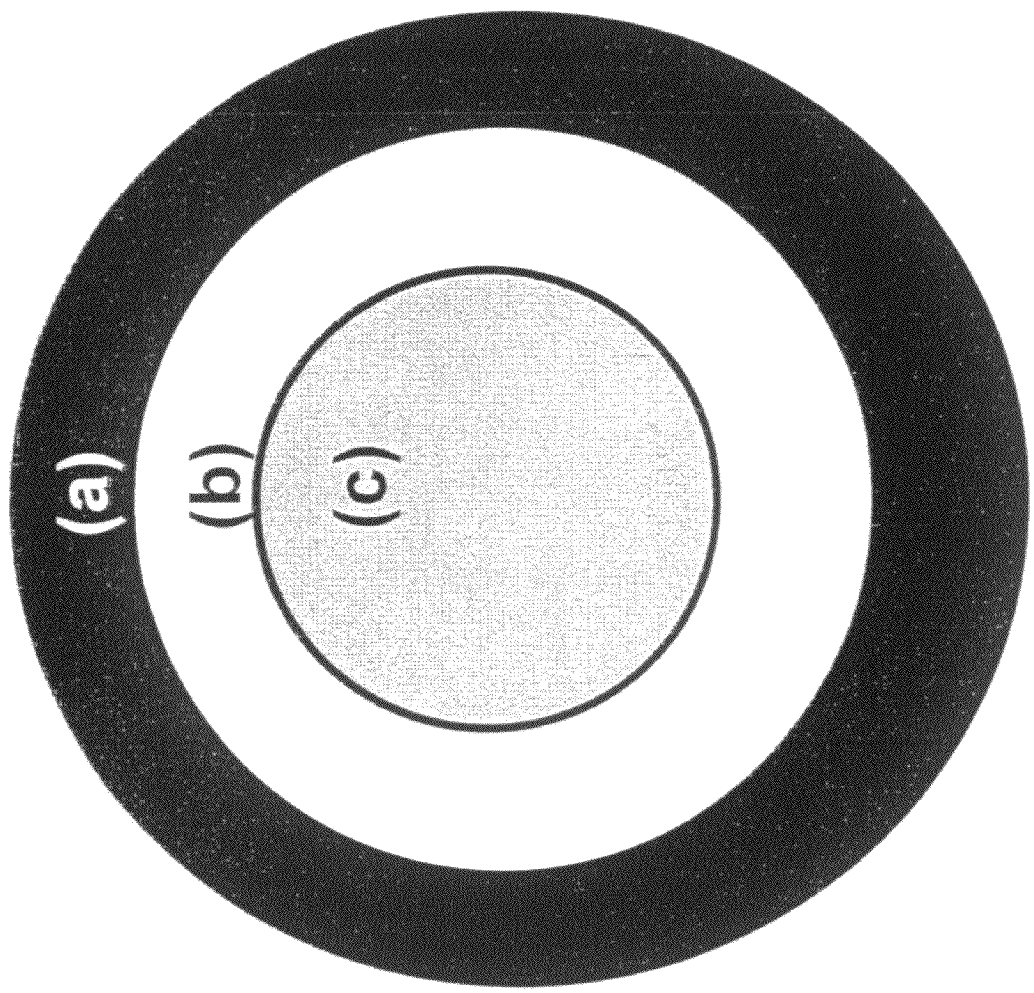
FIG. 18 is another embodiment of the core/shell liquid crystal-polymer composite fiber, where the cross section of the fiber is shown and the composite fiber comprises a) an outer polymer shell, b) a middle polymer shell or a liquid crystal core layer, and (c) a core polymer shell or a liquid crystal core layer. The liquid crystal core can be composed of small molecule liquid crystal materials or liquid crystalline polymers. Polymer material in the fiber composition can be chosen from a wide range of polymers listed in claims. Liquid crystal phase can be chosen from numerous compounds set forth below.
Figure 19:
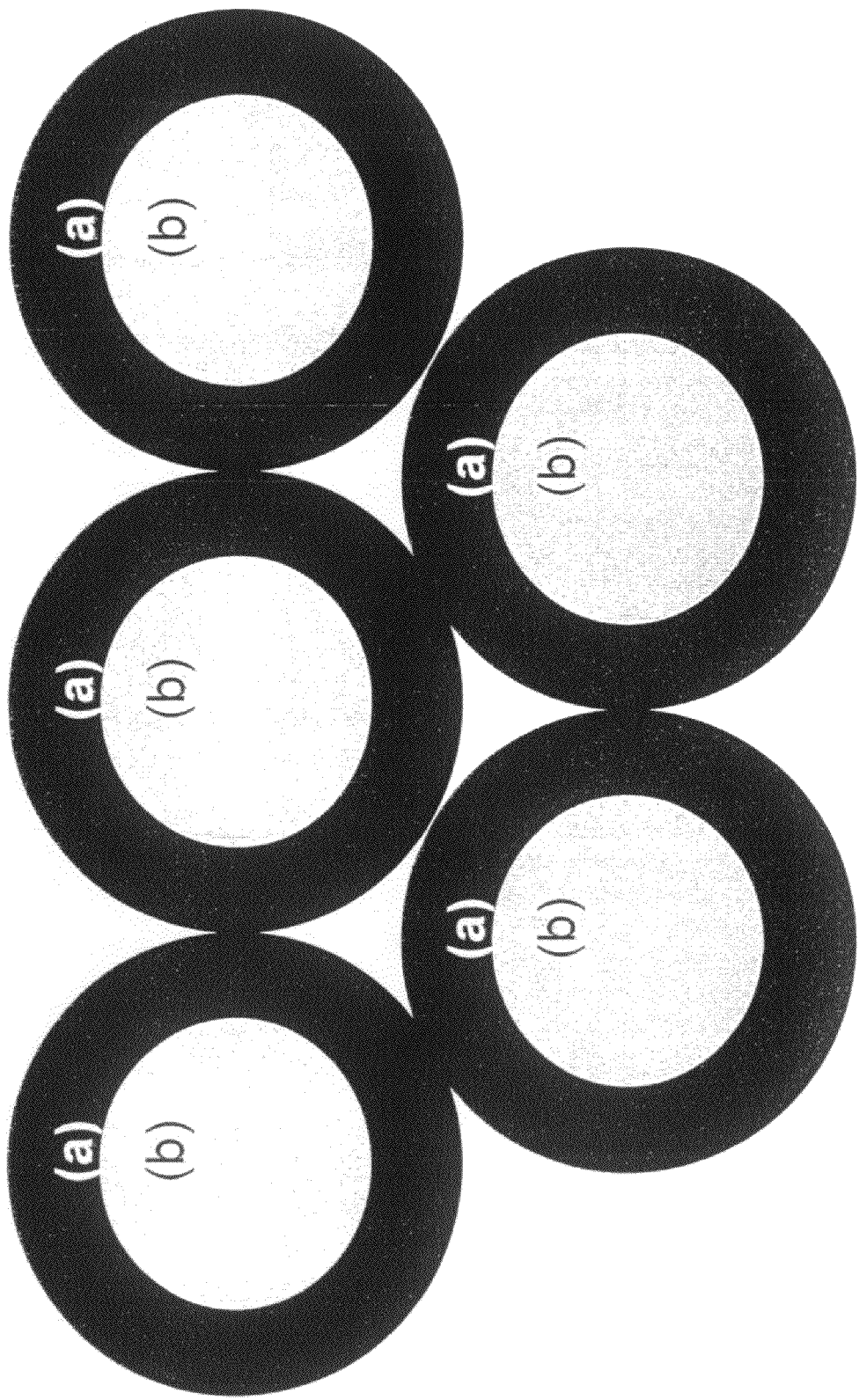
FIG. 19 is an example for multiple stacking of liquid crystal-polymer fibers. A cross sectional view is shown. The composite fiber comprises a) a polymer shell and b) a liquid crystal core layer. The liquid crystal core can be composed of small molecule liquid crystal materials or liquid crystalline polymers. More complex arrangements of the fibers can be acquired by assembling them in various arrays or packing orders.
Figure 20:
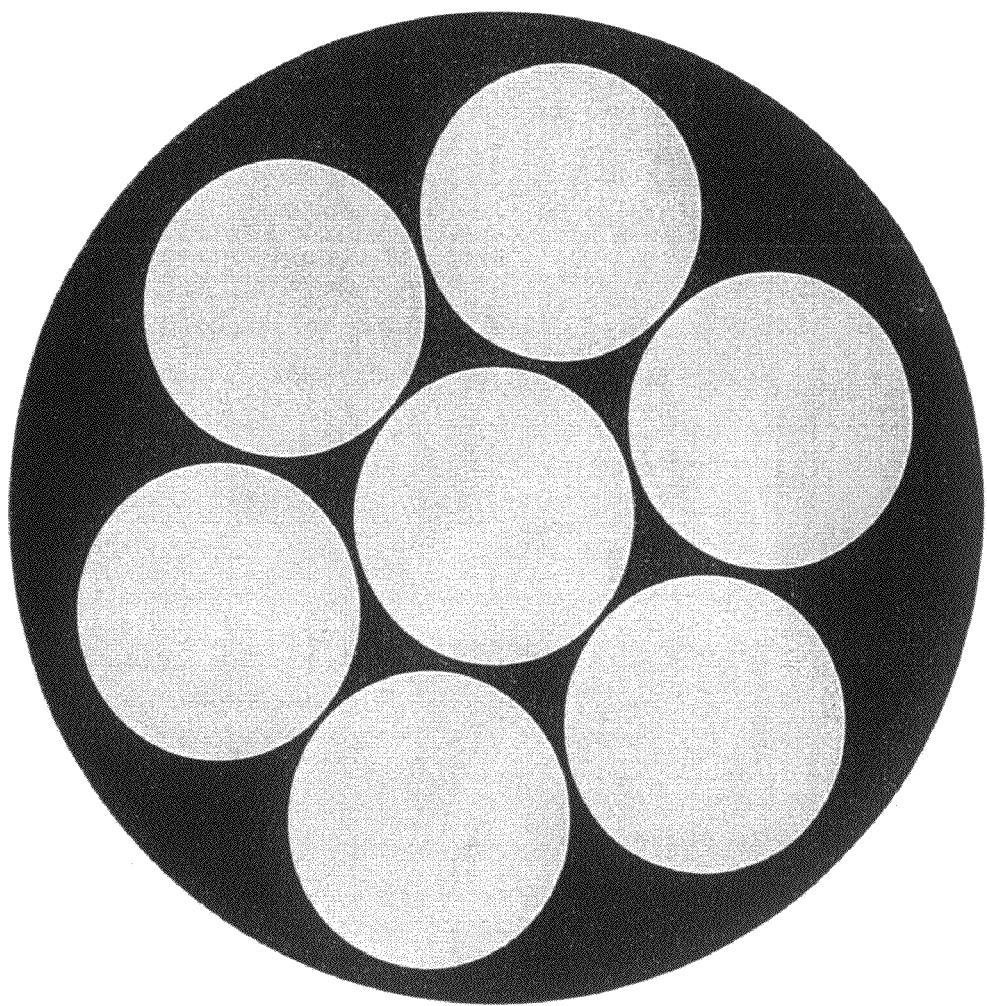
FIG. 20 is another embodiment for the core/shell liquid crystal-polymer composite fiber, where the cross section of the fiber is shown and the composite fiber comprises a) an outer polymer shell, and b) several inner or islands of liquid crystal cores. The shape and the number of core islands can be modified based on the application or by fiber processing parameters. Some of the core islands can be composed of various types of liquid crystalline polymers. The liquid crystal core can be composed of small molecule liquid crystal materials or liquid crystalline polymers. Polymer material in the fiber composition can be chosen from a wide range of polymers set forth below and the liquid crystal phase can be chosen from numerous compounds set forth below. Black areas represent the polymer shell, whereas gray areas represent islands of polymer and/or liquid crystal materials.

Another important aspect of the present invention is that the fiber morphology can be chosen to prepare one or more of the following structures of single or multiple component fibers: hollow segmented pie, striped polymer core, segmented polymer core structure, metal/polymer core fiber, concentric ring polymer fiber, sheath/sheath/core polymer fiber, fibers within fibers, hollow single or multi-component fibers, and the like. For example, a typical polymeric shell-liquid crystal core is shown in FIG. 17 wherein the shell is dark annulus (a) and the liquid crystal core is (b). FIG. 18 relates to a three layer fiber wherein (a) is an outer polymer shell, (b) is a middle polymer shell or a liquid crystal core layer, and (c) is a polymer core or a liquid crystal core layer having a different liquid crystal than that of shell (b). FIG. 19 is an example of multiple polymer shells (a) and liquid crystal cores (b) arranged in a specific geometric arrangement. Naturally, numerous other geometric arrangements can be formed utilizing more or less fibers than depicted in FIG. 19. FIG. 20 is another embodiment wherein several liquid crystal cores are encapsulated within a single polymer phase as shown. Once again, several different geometric arrangements can exist utilizing more or less liquid crystal cores as shown in FIG. 20. Another aspect of the present invention is that the various one or more polymer shell-liquid crystal cores can be assembled or woven into several different configurations, such as one-dimensional, two-dimensional, or three-dimensional arrangements. The polymeric shell-liquid crystal core fibers can also be embedded woven, and/or attached to other yarns or fibers. Moreover, the fibers, either before or after being fabricated or woven, can have the surface thereof treated with the various organic or inorganic compounds or layers to change or increase the functionality thereof such as with respect to thermal, mechanical, chemical, and electro-optical responses. Still further, the extruded fibers during the solidification stage are thereafter can be drawn to induce or increase the strength and/or alignment thereof.

The molecules of the liquid crystal-polymer fibers of the present invention possess anisotropic, electrical, and magnetic properties which render the fibers very useful in a wide variety of end uses. That is, the amount of light emitted by the liquid crystal containing polymer fibers of the present invention can be readily controlled by various fields such as heat, and especially magnetic and/or electrical fields. Thus, the liquid crystal containing polymer fibers can be utilized as optical fibers, in textiles, in nonwoven articles, in optoelectronic devices, and the like. For example the fibers can be utilized in clothes whereupon entering an electric or magnetic field the fibers will exhibit optical transmission and/or reflection of light. More practically, an electrical field can be generated by an electronic device containing batteries in association with the clothes or the fibers can be placed between two layers of a photoconductor. The liquid crystal-polymer fibers can also be used in various magnetic or electrical fields that are programmed to modulate the amount of light emitted therefrom as for use in various displays, read out devices, and the like, or as sensors wherein they detect changes in magnetic and/or electrical fields. When utilized as sensors, the liquid crystal-polymer fibers of the present invention can be utilized to detect temperature change in biological and chemical materials. In addition, the fibers can be used for optical imaging and recording, mechanical testing of materials under stress, as light modulators for color electronic imaging, and the like. When necessary the fibers can be assembled, glued, sprayed, deposited or coated with color filters, polarizers, retardation plates (compensators), transparent electrodes, glass or plastic plates and the like.

The polymer encapsulated liquid crystal fibers of the present invention can contain various additives therein such as chemical markers, membranes, proteins, nucleic acids, cellular components, tissues, and the like with the same being added to the liquid crystal so that during the formation of polymer encapsulated fibers thereof, the additives will be contained therein so that composite stimuli responsive fiber materials and mechanisms can be utilized to develop artificial muscles, optically responsive membranes, and biological sensors for on-site and lab-based diagnostic tests for clinical, food, environmental and biosecurity applications, medical products, dermal applications, and the like.

While in accordance with the patent statutes the best mode and preferred embodiment have been set forth, the scope of the invention is not intended to be limited thereto, but only by the scope of the attached claims.

What is claimed is:

1. A process for forming a liquid crystal containing polymer fiber, comprising the steps of:
   mixing at least one liquid crystal, one or more at least semi-transparent polymers, and at least one solvent, and forming a mixture, wherein said liquid crystal has a weight average molecular weight of from about 200 to about 1,000 grams per mole;
   processing said mixture in the presence of a voltage differential applied across a collection distance;
   phase separating said polymer from said liquid crystal; and
   encapsulating said liquid crystal with said polymer to form a liquid crystal containing polymer fiber.

2. The process of claim 1, wherein said liquid crystal comprises an nematic liquid crystal, a cholesteric liquid crystal, a smectic liquid crystal, a liquid crystal comprising a bent-core molecule, a lyotropic liquid crystal, a columnar mesophase liquid crystal, or a discotic liquid crystalline porphyrin, or any combination thereof; and wherein at least 50% of light incident upon said polymer is transmitted there through according to ASTM-D1003.

3. The process of claim 2, wherein the weight of said liquid crystal is from about 10% to about 90% by weight based upon the total weight of said at least one liquid crystal and said one or more polymers; and wherein at least about 60% of incident upon said polymer is transmitted there through according to ASTM-D1003.

4. The process of claim 3, wherein said liquid crystal comprises a nematic liquid crystal, a cholesteric (chiral nematic) liquid crystal, a smectic A, smectic C, or smectic C* (chiral smectic C), a ferroelectric or antiferroelectric smectic liquid crystal, a liquid crystal compound comprising a bent-core molecule, a columnar mesophase liquid crystal, a discotic liquid crystalline porphyrin, or a lyotropic liquid crystal, or any combination thereof; wherein the weight of said liquid crystal is from about 25% to about 85% by weight based upon the total amount of said at least one liquid crystal and said one or more polymers, and, wherein said polymer comprises polyurethane (PU), polyethylene oxide (PEO), polyacrylonitrile (PAN), polyvinyl acetate,(PVA), cellulose acetate; polyaniline, polypyrrole, polythiophene, polyphenol, polyacteylene, polyphenylene poly(lactic acid) (PLA), poly(methyl methacrylate) (PMMA), poly(glycolic acid) (PGA), polyacrylate, polyester, polyarnide, polyolefin, polyvinylchloride (PVC), poly(amic acid), polyimide, polyether, polysulfone, and any combination thereof.

5. The process of claim 4, wherein the weight of said liquid crystal is from about 40% to about 80% by weight based upon the total weight of said at least one liquid crystal and said one or more polymers; wherein the weight of said solvent is from about 1 to about 95% by weight based upon the total weight of said at least one liquid crystal, said one or more semi-transparent polymers, and said solvent;
   wherein said solvent is a ketone, chloroform, dimethylfurane, tetrahydrofuran, dimethyl formamide, an alcohol having from 1 to about 9 carbon atoms, an amide having from 2 to about 15 carbon atoms, water, an organic acid having from 1 to about 10 carbon atoms, an alkane or a halogenated alkane having from 6 to about 11 carbon atoms, and any combination thereof.

6. The process of claim 5, wherein said polymer is a polyacrylate, polyurethane, polycarbonate, polyester, polylactic acid, or poly(methyl methacrylate), or any combination thereof; and wherein at least about 80% of light incident upon said polymer is transmitted there through according to ASTM-D1003.

7. The process of claim 1, wherein the amount of said voltage differential is from about 5 to about 50 kilo volts; and wherein said collection distance is from about 1 to about 100 cm.

8. The process of claim 5, wherein the amount of said voltage differential is from about 10 to about 30 kilovolts; and wherein said collection distance is from about 3 to about 25 cm.

9. The process of claim 1, wherein the diameter of said fiber is from about 10 nanometers to 1 millimeter.

10. The process of claim 4, wherein the diameter of said fiber is from about 100 nanometers to about 100 microns.

11. The process of claim 8, wherein the diameter of said fiber is from about 250 nanometers to about 10 microns.

12. Modulating the liquid crystal containing polymer fiber of claim 1, by applying an electrical field, magnetic field, or thermal field, or any combination thereof, thereto.

13. Modulating the liquid crystal containing polymer fiber of claim 3, by applying an electrical field, magnetic field, or thermal field, or any combination thereof, thereto.

14. Modulating the liquid crystal containing polymer fiber of claim 5, by applying an electrical field, or magnetic field, or any combination thereof, thereto.

15. Modulating the liquid crystal containing polymer fiber of claim 7, by applying an electrical field, or magnetic field, or any combination thereof, thereto.

16. Modulating the liquid crystal containing polymer fiber of claim 10, by applying an electrical field, or magnetic field, or any combination thereof, thereto.

17. A process for making a liquid crystal-polymer composite fiber, comprising the steps of:
   forming a composition comprising a mixture of at least one liquid crystal, one or more at least semi-transparent polymers, and a solvent, wherein said one or more polymers are partially or fully dissolved by the solvent, said liquid crystal exceeding its solubility limit in said polymer; and
   electrospinning the composition and forming a phase separated liquid crystal-polymer composite fiber having a shell comprising the one or more polymers and a core comprising the at least one liquid crystal.

18. The process of claim 17, wherein said liquid crystal comprises an nematic liquid crystal, a cholesteric liquid crystal, a smectic liquid crystal, a banana mesophase liquid crystal, a lyotropic liquid crystal, a columnar mesophase liquid crystal, and any combination thereof, wherein said liquid crystal has a weight average molecular weight of from about 200 to about 1,000 grams per mole; wherein at least 50% of light incident upon said polymer is transmitted therethrough according to ASTM-D1003, and wherein said one or more polymer comprises polyurethane (PU), polyethylene oxide (PEO), polyacrylonitrile (PAN), polyvinyl acetate (PVA), cellulose acetate; polyaniline, polypyrrole, polythiophene, polyphenol, polyacteylene, polyphenylene poly(lactic acid) (PLA), poly(methyl methacrylate) (PMMA), poly(glycolic acid) (PGA), poly(ethylene oxide), polyacrylate, polyester, polyamide, polyolefin, polyvinylchloride (PVC), poly(amic acid), polyimide, polyether, polysulfone, and any combination thereof.

19. The process of claim 3, wherein said liquid crystal comprises a nematic liquid crystal, a cholesteric (chiral nematic) liquid crystal, a smectic A, smectic C, or smectic C* (chiral smectic C), a ferroelectric or antiferroelectric smectic liquid crystal, a liquid crystal compound comprising a bent-core molecule, a columnar mesophase liquid crystal, a discotic liquid crystalline porphyrin, or a lyotropic liquid crystal, or any combination thereof; wherein said one or more polymers comprises polyacrylate, polyurethane, polycarbonate, polyester, polylactic acid, poly(methyl methacrylate), and any combination thereof; and wherein said fiber has a diameter of from about 100 nanometers to about 100 microns.

20. The process of claim 18, including modulating the liquid crystal-polymer composite fiber by applying an electrical field, or magnetic field, or any combination thereof, thereto.

* * * * *